(12) United States Patent
Buchanan et al.

(10) Patent No.: US 9,975,967 B2
(45) Date of Patent: May 22, 2018

(54) CELLULOSE ESTER OPTICAL FILMS

(75) Inventors: Charles Michael Buchanan, Bluff City, TN (US); Michael Eugene Donelson, Kingsport, TN (US); Elizabeth Guzman-Morales, Kingsport, TN (US); Peter Borden Mackenzie, Kingsport, TN (US); Bin Wang, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 121 days.

(21) Appl. No.: 13/409,735

(22) Filed: Mar. 1, 2012

(65) Prior Publication Data

US 2012/0262650 A1 Oct. 18, 2012

Related U.S. Application Data

(60) Provisional application No. 61/474,932, filed on Apr. 13, 2011.

(51) Int. Cl.
*G02F 1/1335* (2006.01)
*C08B 3/16* (2006.01)
(Continued)

(52) U.S. Cl.
CPC ............... *C08B 3/16* (2013.01); *C08J 5/18* (2013.01); *C08L 1/14* (2013.01); *G02B 1/04* (2013.01);
(Continued)

(58) Field of Classification Search
CPC ...... C08B 3/00; C08B 3/06–3/18; C08B 1/00; C08B 1/02; C08B 3/16; C08B 3/08;
(Continued)

(56) References Cited

U.S. PATENT DOCUMENTS 1,924,238 A 8/1933 Graenacher
1,943,176 A 1/1934 Graenacher
(Continued)

FOREIGN PATENT DOCUMENTS

CN 1417407 A 5/2003
CN 1491974 A 4/2004
(Continued)

OTHER PUBLICATIONS

Okubo, JP 2006328298 A, English Machine Translation: http://dossier1.ipdl.inpit.go.jp/AIPN/odse_top_dn.ipdl?N0000=7400.*
(Continued)

*Primary Examiner* — Eli D Strah
(74) *Attorney, Agent, or Firm* — Steven A. Owen

(57) ABSTRACT

Regioselectively substituted cellulose esters having a plurality of aryl-acyl substituents and a plurality of alkyl-acyl substituents are disclosed along with methods for making the same. Such cellulose esters may be suitable for use in optical films, such as optical films having certain Nz values, −A optical films, and/or +C optical films. Optical films prepared employing such cellulose esters have a variety of commercial applications, such as, for example, as compensation films in liquid crystal displays and/or waveplates in creating circular polarized light used in 3-D technology.

18 Claims, 5 Drawing Sheets

(51) Int. Cl.
*C08J 5/18* (2006.01)
*C08L 1/14* (2006.01)
*G02B 1/04* (2006.01)
*C08B 3/00* (2006.01)
*C08B 3/06* (2006.01)
*C08B 3/08* (2006.01)
*G02F 1/13363* (2006.01)

(52) U.S. Cl.
CPC ........... *B32B 2457/202* (2013.01); *C08B 3/00* (2013.01); *C08B 3/06* (2013.01); *C08B 3/08* (2013.01); *C08J 2301/14* (2013.01); *G02F 1/13363* (2013.01); *G02F 2001/133631* (2013.01); *Y10T 428/10* (2015.01); *Y10T 428/105* (2015.01); *Y10T 428/1036* (2015.01)

(58) Field of Classification Search
CPC . C08J 5/18; C08J 2301/14; C08L 1/00; C08L 1/08–1/14; G02F 1/1393–1/1395; G02F 2001/133311; Y10T 428/10; Y10T 428/1036; G02B 1/04; B32B 23/00; B32B 23/08; B32B 23/20; B32B 2457/202
USPC ...... 428/1.1, 1.3, 1.31, 1.33, 1.5, 1.54, 1.55, 428/1.6, 1.61; 536/63–65; 349/18, 56, 349/74, 75, 84, 117, 167, 177, 179, 181
See application file for complete search history.

(56) References Cited

U.S. PATENT DOCUMENTS

| | | | |
|---|---|---|---|
| 1,996,754 | A | 4/1935 | Dreyfus et al. |
| 2,563,506 | A | 8/1951 | Werntz |
| 3,505,313 | A | 4/1970 | Ichiro |
| 4,028,132 | A | 6/1977 | Litt et al. |
| 4,189,761 | A | 2/1980 | Finkelstein et al. |
| 4,278,790 | A | 7/1981 | McCormick et al. |
| 4,501,888 | A | 2/1985 | Schmidt |
| 4,557,951 | A | 12/1985 | Verbanac |
| 4,592,885 | A | 6/1986 | Ichino et al. |
| 4,597,798 | A | 7/1986 | Kamata et al. |
| 5,093,486 | A | 3/1992 | Diamantoglou |
| 5,360,902 | A | 11/1994 | Oke et al. |
| 5,610,233 | A | 3/1997 | Sharma |
| 5,876,567 | A | 3/1999 | Yamamoto et al. |
| 5,929,229 | A | 7/1999 | Edgar et al. |
| 5,977,347 | A | 11/1999 | Shuto et al. |
| 6,500,215 | B1 | 12/2002 | Login et al. |
| 6,596,130 | B2 | 7/2003 | Westman |
| H2083 | H | 10/2003 | Bogard et al. |
| 6,808,557 | B2 | 10/2004 | Holbrey et al. |
| 6,824,599 | B2 | 11/2004 | Swatloski et al. |
| 6,827,773 | B2 | 12/2004 | Cuculo et al. |
| 6,872,766 | B2 | 3/2005 | Schunk et al. |
| 6,939,974 | B2 | 9/2005 | Earle et al. |
| 7,122,660 | B1 | 10/2006 | Nakanishi et al. |
| 7,172,713 | B2 | 2/2007 | Arai et al. |
| 7,208,605 | B2 | 4/2007 | Davis, Jr. |
| 7,252,791 | B2 | 8/2007 | Wasserscheid et al. |
| 7,351,339 | B2 | 4/2008 | Maase et al. |
| 7,501,522 | B2 | 3/2009 | Maase et al. |
| 7,550,520 | B2 | 6/2009 | Daly et al. |
| 7,605,271 | B2 | 10/2009 | Uchimura et al. |
| 7,754,002 | B2 | 7/2010 | Maase |
| 7,879,994 | B2 | 2/2011 | Buchanan et al. |
| 7,919,631 | B2 | 4/2011 | Buchanan et al. |
| 8,148,518 | B2 | 4/2012 | Buchanan et al. |
| 8,158,777 | B2 | 4/2012 | Buchanan et al. |
| 8,188,267 | B2 | 5/2012 | Buchanan et al. |
| 2003/0036493 | A1 | 2/2003 | Alam et al. |
| 2003/0094380 | A1 | 5/2003 | Moulton |
| 2004/0035293 | A1 | 2/2004 | Davis, Jr. |
| 2004/0059106 | A1 | 3/2004 | Yamada et al. |
| 2004/0181009 | A1 | 9/2004 | Shelton et al. |
| 2004/0233362 | A1 | 11/2004 | Kashima |
| 2005/0020857 | A1 | 1/2005 | Volland et al. |
| 2005/0050842 | A1 | 3/2005 | Komiyama et al. |
| 2005/0054638 | A1 | 3/2005 | Barlaam et al. |
| 2005/0133953 | A1 | 6/2005 | Yamazaki et al. |
| 2005/0192434 | A1 | 9/2005 | Buchanan et al. |
| 2005/0288484 | A1 | 12/2005 | Holbrey et al. |
| 2006/0004192 | A1 | 1/2006 | Oya et al. |
| 2006/0062749 | A1 | 3/2006 | Shelton et al. |
| 2006/0094615 | A1 | 5/2006 | Hecht et al. |
| 2006/0149074 | A1 | 7/2006 | Maase et al. |
| 2006/0221280 | A1* | 10/2006 | Oka et al. ..................... 349/117 |
| 2006/0226396 | A1 | 10/2006 | Majumdar et al. |
| 2006/0241287 | A1 | 10/2006 | Hecht et al. |
| 2007/0006774 | A1 | 1/2007 | Rogers et al. |
| 2007/0010688 | A1 | 1/2007 | Ko et al. |
| 2007/0035682 | A1* | 2/2007 | Ito et al. ......................... 349/98 |
| 2007/0054216 | A1 | 3/2007 | Habu |
| 2007/0073051 | A1 | 3/2007 | Myllymaki et al. |
| 2007/0093462 | A1 | 4/2007 | Rogers et al. |
| 2007/0093655 | A1 | 4/2007 | Oya et al. |
| 2007/0112185 | A1 | 5/2007 | Myllymaki et al. |
| 2007/0142642 | A1 | 6/2007 | Szarvas et al. |
| 2007/0142646 | A1 | 6/2007 | Maase et al. |
| 2007/0200987 | A1 | 8/2007 | Yoda et al. |
| 2007/0215300 | A1 | 9/2007 | Upfal et al. |
| 2007/0222927 | A1 | 9/2007 | Uehara et al. |
| 2007/0225190 | A1 | 9/2007 | Scheibel et al. |
| 2007/0225191 | A1 | 9/2007 | Scheibel et al. |
| 2007/0255064 | A1 | 11/2007 | Szarvas et al. |
| 2007/0259134 | A1* | 11/2007 | Nozoe ........................ C08B 3/06 428/1.31 |
| 2007/0285603 | A1 | 12/2007 | Nakayama et al. |
| 2007/0290168 | A1 | 12/2007 | Fukagawa et al. |
| 2008/0003444 | A1 | 1/2008 | Oya |
| 2008/0023162 | A1 | 1/2008 | Myllymaki et al. |
| 2008/0033187 | A1 | 2/2008 | Zhao et al. |
| 2008/0164440 | A1 | 7/2008 | Maase et al. |
| 2008/0188636 | A1 | 8/2008 | Argyropoulos et al. |
| 2008/0190321 | A1 | 8/2008 | Maase et al. |
| 2008/0192192 | A1 | 8/2008 | Toyama et al. |
| 2008/0194807 | A1 | 8/2008 | Buchanan et al. |
| 2008/0194808 | A1 | 8/2008 | Buchanan et al. |
| 2008/0194834 | A1 | 8/2008 | Buchanan et al. |
| 2008/0227162 | A1 | 9/2008 | Varanasi et al. |
| 2008/0241536 | A1 | 10/2008 | Luo et al. |
| 2008/0269477 | A1 | 10/2008 | Stegmann et al. |
| 2008/0287684 | A1 | 11/2008 | Exner et al. |
| 2009/0002605 | A1* | 1/2009 | Imai et al. ..................... 349/75 |
| 2009/0011473 | A1 | 1/2009 | Varanasi et al. |
| 2009/0012297 | A1 | 1/2009 | Pagoria et al. |
| 2009/0020112 | A1 | 1/2009 | Massonne et al. |
| 2009/0021673 | A1 | 1/2009 | Fukagawa et al. |
| 2009/0032015 | A1 | 2/2009 | Myllymaki et al. |
| 2009/0033839 | A1 | 2/2009 | Fukuda |
| 2009/0043088 | A1 | 2/2009 | Shimamoto et al. |
| 2009/0050842 | A1* | 2/2009 | Shelby et al. ............. 252/182.3 |
| 2009/0053429 | A1 | 2/2009 | Sasada |
| 2009/0062524 | A1 | 3/2009 | Massonne et al. |
| 2009/0084509 | A1 | 4/2009 | Luo et al. |
| 2009/0088564 | A1 | 4/2009 | Luo et al. |
| 2009/0096962 | A1 | 4/2009 | Shelton et al. |
| 2009/0097117 | A1* | 4/2009 | Coleman ....................... 359/497 |
| 2009/0111981 | A1* | 4/2009 | Kuwabara et al. ............. 536/63 |
| 2009/0171079 | A1 | 7/2009 | Higuchi |
| 2009/0181232 | A1 | 7/2009 | Wang et al. |
| 2009/0182138 | A1 | 7/2009 | Massonne et al. |
| 2009/0187016 | A1 | 7/2009 | Massone et al. |
| 2009/0198046 | A1 | 8/2009 | Fanselow et al. |
| 2009/0203899 | A1 | 8/2009 | Buchanan et al. |
| 2009/0221813 | A1 | 9/2009 | Moellmann et al. |
| 2009/0326216 | A1 | 12/2009 | Stegmann et al. |
| 2010/0029927 | A1 | 2/2010 | Buchanan et al. |
| 2010/0055356 | A1 | 3/2010 | Takeda et al. |
| 2010/0267942 | A1 | 10/2010 | Buchanan et al. |
| 2010/0305249 | A1 | 12/2010 | Buchanan et al. |
| 2011/0021842 | A1 | 1/2011 | Nishimoto et al. |
| 2011/0166340 | A1 | 7/2011 | Shibata et al. |

(56) References Cited

U.S. PATENT DOCUMENTS

| | | |
|---|---|---|
| 2012/0003403 A1 | 1/2012 | Wang et al. |
| 2012/0238741 A1 | 9/2012 | Buchanan et al. |
| 2012/0238742 A1 | 9/2012 | Buchanan et al. |
| 2012/0262650 A1 | 10/2012 | Buchanan et al. |
| 2012/0263889 A1 | 10/2012 | Buchanan et al. |
| 2012/0263890 A1 | 10/2012 | Buchanan et al. |
| 2014/0343271 A1 | 11/2014 | Buchanan et al. |

FOREIGN PATENT DOCUMENTS

| | | |
|---|---|---|
| CN | 1804161 | 7/2006 |
| CN | 1958616 A | 5/2007 |
| CN | 1978433 A | 6/2007 |
| CN | 101085838 | 12/2007 |
| CN | 101234197 | 8/2008 |
| CN | 101240085 A | 8/2008 |
| CN | 101284913 | 10/2008 |
| CN | 101285213 | 10/2008 |
| CN | 101289817 | 10/2008 |
| CN | 100471843 C | 2/2009 |
| DE | 10 2006 028 165 A1 | 12/2007 |
| DE | 10 2007 035 322 A1 | 1/2009 |
| DE | 22 62 829 A1 | 7/2017 |
| EP | 911656 A2 | 4/1999 |
| EP | 1 215 216 A1 | 6/2002 |
| EP | 1 860 201 A | 11/2007 |
| EP | 1 911 792 A1 | 4/2008 |
| EP | 1 911 829 A1 | 4/2008 |
| EP | 2 072 530 A1 | 6/2009 |
| FR | 2831171 A1 | 4/2003 |
| GB | 572 017 A | 9/1945 |
| GB | 581 046 A | 9/1946 |
| GB | 611 665 A | 11/1948 |
| GB | 689 194 A | 3/1953 |
| GB | 736 964 A | 9/1955 |
| GB | 1 519 648 A | 8/1978 |
| JP | 6-329603 | 11/1994 |
| JP | 2002-179701 A | 6/2002 |
| JP | 2002-265501 A | 9/2002 |
| JP | 2002-275132 A | 9/2002 |
| JP | 2004-175785 A | 6/2004 |
| JP | 2005-089689 | 4/2005 |
| JP | 2005-281645 | 10/2005 |
| JP | 2005-307055 | 11/2005 |
| JP | 2006-265544 | 5/2006 |
| JP | 2006-137677 | 6/2006 |
| JP | 2006-137677 A | 6/2006 |
| JP | 2006-213778 | 8/2006 |
| JP | 2006-232959 | 9/2006 |
| JP | 2006328298 A * | 12/2006 |
| JP | 2007-332292 A | 12/2007 |
| JP | 2008-156623 A | 7/2008 |
| JP | 2008-248217 | 10/2008 |
| JP | 2008-266625 A | 11/2008 |
| JP | 2008-303319 A | 12/2008 |
| JP | 2009-91542 A | 4/2009 |
| WO | WO 99/14160 A1 | 3/1999 |
| WO | WO 01/77081 A1 | 10/2001 |
| WO | WO 03/029329 A2 | 4/2003 |
| WO | WO 2004/083253 A1 | 9/2004 |
| WO | WO 2005/054297 A2 | 6/2005 |
| WO | WO 2005/070896 A1 | 8/2005 |
| WO | WO 2006/013869 A1 | 2/2006 |
| WO | WO 2006/021302 A1 | 3/2006 |
| WO | WO 2006/027069 A1 | 3/2006 |
| WO | WO 2006/027070 A1 | 3/2006 |
| WO | WO 2006-027070 A1 | 3/2006 |
| WO | WO 2006/038013 A2 | 4/2006 |
| WO | WO 2007/049485 A1 | 5/2007 |
| WO | WO 2007/101813 A1 | 9/2007 |
| WO | WO 2007/111339 A1 | 10/2007 |
| WO | WO 2007/144282 A1 | 12/2007 |
| WO | WO 2007/147813 A1 | 12/2007 |
| WO | WO 2008/000666 A1 | 1/2008 |
| WO | WO 2008/043837 A1 | 4/2008 |
| WO | WO 2008/062209 A2 | 5/2008 |
| WO | WO 2008/090156 A1 | 7/2008 |
| WO | WO 2008/098037 A2 | 8/2008 |
| WO | WO 2008/100566 A1 | 8/2008 |
| WO | WO 2008/100569 A1 | 8/2008 |
| WO | WO 2008/100577 A1 | 8/2008 |
| WO | WO 2008/102747 A1 | 8/2008 |
| WO | WO 2008/114584 | 9/2008 |
| WO | WO 2008/119770 A1 | 10/2008 |
| WO | WO 2008/133269 A1 | 11/2008 |
| WO | WO 2008/143765 A2 | 11/2008 |
| WO | WO 2009/027250 A2 | 3/2009 |
| WO | WO 2009/029220 A1 | 3/2009 |
| WO | WO 2009/030950 A1 | 3/2009 |
| WO | WO 2009/062723 A1 | 5/2009 |
| WO | WO 2009/077452 A1 | 6/2009 |
| WO | WO 2009/101111 A1 | 8/2009 |
| WO | WO 2009/102305 A1 | 8/2009 |
| WO | WO 2009/102306 A1 | 8/2009 |
| WO | WO 2009/102307 A1 | 8/2009 |
| WO | WO 2010/120268 A1 | 10/2010 |
| WO | WO 2010/120269 A1 | 10/2010 |

OTHER PUBLICATIONS

USPTO Office Action dated May 24, 2012 for copending U.S. Appl. No. 13/339,814.
New copending U.S. Appl. No. 13/449,978, filed Apr. 18, 2012, Charles Michael Buchanan et al.
New copending U.S. Appl. No. 13/486,042, filed Jun. 1, 2012, Charles Michael Buchanan et al.
New copending U.S. Appl. No. 13/486,043, filed Jun. 1, 2012, Charles Michael Buchanan et al.
USPTO Office Action dated Apr. 2, 2012 for copending U.S. Appl. No. 12/539,817.
Notice of Allowance and Fees Due dated Oct. 15, 2012 received in co-pending U.S. Appl. No. 12/539,812.
Office Action notification dated Nov. 5, 2012 received in co-pending U.S. Appl. No. 13/339,814.
Office Action notification dated Nov. 5, 2012 received in co-pending U.S. Appl. No. 13/396,700.
Office Action notification dated Nov. 7, 2012 received in co-pending U.S. Appl. No. 12/539,800.
Office Action notification dated Dec. 21, 2012 received in co-pending U.S. Appl. No. 13/278,796.
USPTO Notice of Allowance dated Jan. 24, 2013 for copending U.S. Appl. No. 13/330,828.
Heinze, Thomas et al.; "Interactions of Ionic Liquids with Polysaccharides 1. Unexpected Acetylation of Cellulose with 1-Ethyl-3-methylimidazolium"; Macromolecular Journals; 2007; 28; pp. 2311-2317.
Heinze, Thomas et al.; "Interactions of Ionic Liquids with polysaccharides-2: Cellulose"; Macromol. Symp; 2008; pp. 8-22; 262.
Richardson, Sara and Gorton, Lo; "Characterisation of the Substituent Distribution in Starch and Cellulose Derivatives"; Analytica Chimica Acta; 2003; pp. 27-65; 497.
Schnabelrauch, Mathias, et al., "Readily hydrolyzable cellulose esters as intermediates for the regioselective derivatization of cellulose. 1. Synthesis and characterization of soluble, low-substituted cellulose formatted." Angewandte Makromolekulare Chemie (1992), 198, 155-164.
USPTO Notice of Allowance dated Jul. 26, 2012 for copending U.S. Appl. No. 12/539,814.
USPTO Notice of Allowance dated Mar. 15, 2012 for copending U.S. Appl. No. 12/189,421.
Notification of Transmittal of the International Search Report with dated Jul. 26, 2012 for International Application No. PCT/US2012-031069.
Notification of Transmittal of the International Search Report dated Jul. 26, 2012 for International Application No. PCT/US2012-031062.
Notification of Transmittal of the International Search Report dated Jul. 26, 2012 for International Application No. PCT/US2012-031064.

(56) References Cited

OTHER PUBLICATIONS

Notification of Transmittal of the International Search Report dated Jul. 26, 2012 for International Application No. PCT/US2012-031077.
USPTO Notice of Allowance dated Jul. 24, 2012 for copending U.S. Appl. No. 13/217,326.
USPTO Office Action dated Jul. 2, 2012 for copending U.S. Appl. No. 13/330,828.
Office Action notification dated Jun. 6, 2013 received in co-pending U.S. Appl. No. 13/357,635.
Office Action notification dated Jun. 18, 2013 received in co-pending U.S. Appl. No. 13/409,724.
Office Action notification dated Jul. 19, 2013, 2013 received in co-pending U.S. Appl. No. 13/409,743.
Office Action notification dated Aug. 29, 2013 received in co-pending U.S. Appl. No. 13/396,700.
Office Action notification dated Sep. 9, 2013 received in co-pending U.S. Appl. No. 13/109,747.
Edgar et al., "Long-Chain Cellulose Esters: Preparation, Properties, and Perspective," In Cellulose Derivatives, Heinze t. et al., ACS Symposium Series 688: Washington, DC, 1998, pp. 38-60.
Heinz et al., "Unconventional Methods in Cellulose Functionalization," Prog. Polym. Sci., 2001, 26, pp. 1689-1762.
Reier, G.E. Avicel PH Microcrystalline Cellulose, 2000, pp. 1-27, FMC biopolymers website, www.fmcbiopolyner.com/Portals/bio/content/Docs/PS-Section%2011.pdf accessed on Aug. 13, 2013.
Spurlin, H.M.; "Arrangement of Substituents in Cellulose Derivatives," J. Am. Chem. Soc., 1939, 61, pp. 2222-2227.
Office Action notification dated Feb. 24, 2014 received U.S. Appl. No. 13/357,635.
Richardson, Sara and Gorton, Lo; "Characterisation of the Substituent Distribution in Starch and Cellulose Derivatives"; Analytica Chimica Acta; 2003; pp. 27-65; 497.
Notice of Allowance and Fees Due dated Jul. 25, 2014 received in co-pending U.S. Appl. No. 13/357,635.
New co-pending U.S. Appl. No. 14/477,704, filed Jul. 31, 2014; Charles Buchanan et al.
Office Action notification dated Sep. 9, 2013 received in co-pending U.S. Appl. No. 13/357,636.
Notice of Allowance and Fees Due dated Mar. 24, 2014 received in co-pending U.S. Appl. No. 13/409,724.
Office Action notification dated May 20, 2014 received in co-pending U.S. Appl. No. 13/357,636.
Notice of Allowance and Fees Due dated Jun. 11, 2014 received in co-pending U.S. Appl. No. 13/357,635.
Office Action notification dated Jul. 3, 2014 received in co-pending U.S. Appl. No. 12/539,800.
Non-Final Office Action notification dated Aug. 25, 2014 received in co-pending U.S. Appl. No. 13/449,978.
Acemoglu, Murat, et al.; "Synthesis of regioselectively substituted cellulose derivatives and applications in chiral chromatography"; Chirality (1998), 10(4), 294-306.
Avalos, Martin et al.; "Grünere Medien fur chemische Synthesen und Verfahren"; Angew. Chem. 2006, 118, 4008-1012 (Citation for English version is: Angewandte Chemie International Edition, 2006, 45(24), 3904-3908).
Barthel et al.; "Acylation and carbanilation of cellulose in ionic liquids"; Green Chem., 2006, 8, pp. 301-306.
Bicak, Niyazi; "A new ionic liquid: 2-hydroxy ethylammonium formate"; Journal of Molecular Liquids 116 (2005) 15-18.
Buchanan, Charles M., et al.; "Preparation and Characterization of Cellulose Monoacetates: The Relationship between Structure and Water Solubility"; Macromolecules 1991, 24, 3060-3064.
Buchanan, Charles M., et al.; "Preparation of Cellulose [1-$^{13}$C] Acetates and Determination of Monomer Compositions by NMR Spectroscopy"; Macromolecules 1991, 3050-3059.
Cao et al.; "Acetone-soluble cellulose acetates prepared by one-step homogeneous acetylation of cornhusk cellulose in an ionic liquid 1-allyl-3-methylimidazolium chloride (AmimCl)"; Elsevier, Carbohydrate Polymers, vol. 69, Issue 4, (2007), pp. 665-672.

Co-pending U.S. Appl. No. 12/030,387, titled "Cellulose Esters and Their Production in Carboxylated Ionic Liquids", filled Feb. 13, 2008; Now published as US 2008-0194808 A1 cited above.
Co-pending U.S. Appl. No. 12/030,425, titled "Production of Ionic Liquids", filed Feb. 13, 2008; Now published as US 2008-0194834 A1 cited above.
Co-Pending U.S. Appl. No. 12/030,434, titled "Reformation of Ionic Liquids", filed Feb. 13, 2008; Now published as US 2008-0194807 A1 cited above.
Co-pending U.S. Appl. No. 12/189,415, titled "Cellulose Esters and Their Production in Halogenated Ionic Liquids", filed Aug. 11, 2008.
Co-pending U.S. Appl. No. 12/189,421, titled "Treatment of Cellulose Esters", filed Aug. 11, 2008.
Co-pending U.S. Appl. No. 12/189,753, titled "Production of Cellulose Esters in the Presence of a Cosolvent", filed Aug. 11, 2008.
Crosthwaite et al.; "Phase transition and decomposition temperatures, heat capacities and viscosities of pyridinium ionic liquids"; Elsevier; J. Chem. Thermodynamics 37 (2005), pp. 559-568.
Edgar, Kevin J., et al.; "Advances in cellulose ester performance and application"; Prog. Polym. Sci. 26 (2001) 1605-1688.
El Seoud et al.; "Applications of Ionic Liquids in Carbohydrate Chemistry: A Window of Opportunities"; Biomacromolecules, Sep. 2007, Published by the American Chemical Society, vol. 8, No. 9, pp. 2629-2640, pp. 3752-3758.
Fujimoto, et al.; "13C NMR spectral studies on the distribution of substituents in some cellulose derivatives"; J. Polym. Sci.: Part A: Polymer Chemistry Edition, 1986, 24, 2993.
Fukaya et al.; "Superior Solubility of Polysaccharides in Low Viscosity, Polar, and Halogen-Free 1,3-Dialkylimidazolium Formates"; BioMacrololecules, Dec. 2006, Published by the American Chemical Society, vol. 7, No. 12, pp. 3295-3297.
Fukaya et al.; "Supporting Information—Superior Solubility of Polysaccharides in Low Viscosity, Polar and Halogen-Free 1,3-Dialkylimidazolium Formates"; Department of Biotechnology, Tokyo University of Agriculture and Technology; pp. 1-4, Nov. 14, 2006.
Heinze et al.; "Ionic Liquids as Reaction Medium in Cellulose Functionalization"; Macromolecular Bioscience 2005, 5, pp. 520-525.
Heinze, et al.; "Synthesis and carboxymethylation of organo-soluble trifluoroacetates and ormats of cellulose"; J.M.S.-Pure Appl. Chem. 1996, A33(5), 613-626.
Heinze, et al.; "Synthesis path versus distribution of functional groups in cellulose esters"; Macromol. Symp. 1998, 130, 271-283.
Heinze, Thomas, et al.; "Synthesis and subsequent reactions of cellulose-p- toluenesulfonic acid esters. Pool for new functional polymers."; Papier (Darmstadt) (1996), 50(12), 721-729.
Huddleston et al.; "Characterization and comparison of hydrophilic and hydrophobic room temperature ionic liquids incorporating the imidazolium cation"; The Royal Society of Chemistry 2001; Green Chemistry, 2001, 3, pp. 156-164.
Husemann, E. et al.; "N-Äthyl-pyridinium-chlorid als Lösungsmittel und Reaktionsmedium fur Cellulose"; Makromolekulare Chemie, 128 (1969) 288-291 (nr. 3178).
Iwata, Tadahisa, et al.; "Conformational analysis of regioselectively substituted cellulose esters"; Sen'i Gakkaishi (1991), 47(8), 379-83.
Iwata, Tadahisa, et al.; "Preparation and NMR assignments of cellulose mixed esters regioselectively substituted by acetyl and propanoyl groups"; Carbohydrate Research (1992), 224, 277-83.
Kametani et al.; "Novel Methylation. III (1a). Methylation of Tertiary Amines such as Pyridine and Isoquinoline with Alkyl Carboxylates (1b)."; J. Heterocycl. Chem., 1966, 3, pp. 129-136.
Kasuya, Natsuki, et al.; "Chiral discrimination with regioselectively substituted cellulose esters as chiral stationary phases"; Chirality (2000), 12(9), 670-674.
Klemm, D., et al.; "New procedures for regioselective synthesis and modification of trialkylsilylcelluloses"; Cellulosics: Materials for Selective Separations and Other Technologies, 1993, Chapter 26, 221-226.
Klemm, D., et al.; "Polyglucane derivatives with regular substitutent distribution"; Macromol. Symp. 1995, 99, 129-140.

(56) References Cited

OTHER PUBLICATIONS

Klemm, D., et al.; "Readily hydrolyzable cellulose esters as intermediates for the regioselective derivatization of cellulose"; Die Angewandte Makromolekulare Chemie 1992, 198, 155-164.
Klemm, D., et al.; "Readily hydrolyzable cellulose esters as intermediates for the regioselective derivatization of cellulose"; Cellulose Chem. Technol. 1990, 24, 667-678.
Klemm, D.O., et al.; "Silylated Cellulose Materials in Design of Supramolecular Structure of Ultrathin Films"; J.M.S.-Pure Appl. Chem. 1995, A32, 899-904.
Klemm, D.O.; "Regiocontrol in Cellulose Chemistry: Principles and Examples of Etherification and Esterification"; Cellulose Derivatives: Modification, Characterization, and Nanostructures, ACS Symposium Series 688, T.J. Heinze and W.G. Glasser, Editors, 1998, Oxford University Press, 19-37.
Kondo, T.; "Preparation of 6-O-alkylcelluloses"; Carbohydr. Res. 1993, 238, 231-240.
Laus et al.; "Ionic Liquids: Current Developments, Potential and Drawbacks for Industrial Applications"; Lenzinger Berichte, 84 (2005), pp. 71-85.
Liebert et al.; "Click Chemistry with Polysaccharides"; Macromolecular Rapid Communications, 2006, 27, pp. 208-213.
Liebert, Tim, et al.; "Readily hydrolyzable cellulose esters as intermediates for the regioselective derivatization of cellulose. Part II Soluble, highly substituted cellulose trifluoroacetates."; Cellulose (London) (1994), 1(4), 249-258.
MacFarlane, et al.; "Lewis base ionic liquids"; The Royal Society of Chemistry 2006; Chem. Commun., 2006, 1905-1917.
Mayumi, Ayaka, et al.; "Partial substitution of cellulose by ring-opening esterification of cyclic esters in a homogeneous system"; Journal of Applied Polymer Science (2006), 102(5), 4358-4364.
Moulthrop et al.; "High-resolution $^{13}$C NMR studies of cellulose and cellulose oligomers in ionic liquid solutions"; The Royal Society of Chemistry 2005; Chem. Commun., 2005, pp. 1557-1559.
Murugesan et al.; "Benzoate-based room temperature ionic liquids—thermal properties and glycosaminoglycan dissolution"; Elsevier; Carbohydrate Polymers 63 (2006), pp. 268-271.
Nishio, Naotaka, et al.; "Preparation of high regioselectively mono-substituted carboxymethyl celluloses"; Cellulose Chemistry and Technology (2005), 39(5-6), 377-387.
Notification of Transmittal of the International Search Report and the Written Opinion of the International Searching Authority, or the Declaration dated Jun. 20, 2008; International Application No. PCT/US2008/001952.
Notification of Transmittal of the International Search Report and the Written Opinion of the International Searching Authority, or the Declaration dated Jun. 27, 2008; International Application No. PCT/US2008/001958.
Notification of Transmittal of the International Search Report and the Written Opinion of the International Searching Authority, or the Declaration dated Jul. 4, 2008; International Application No. PCT/US2008/001975.
Philipp, B., et al.; "Regioselective esterification and etherification of cellulose and cellulose derivatives. Part 2. Synthesis of regioselective cellulose esters."; Papier (Bingen, Germany) (1995), 49(2), 58-64.
Philipp, Burkart, et al.; "Regioselective derivatization of cellulose. Routes of synthesis, effects on properties, and areas of application."; Polymer News (1996), 21(5), 155-161.
Philipp, Burkart, et al.; "Regioselective esterification and etherification of cellulose and cellulose derivatives. Part 1. Problems and descriptions of the reaction systems."; Papier (Bingen, Germany) (1995), 49(1), 3-7.
Philipp, Burkart, et al.; "Untersuchungen Zur Sulfatierung Von Celluloseformiat Im Vergleich Zu Cellulose-Acetat Unter Homogenen Reaktionsbedingungen"; [Investigations on Sulfation of Cellulose Formate in Comparison with Cellulose Acetate under Homogeneous reaction conditions]; Cellulose Chemistry and Technology, 24, 667-678 (1990).

Potthast et al.; "Hydrolytic processes and condensation reactions in the cellulose solvent system N,N-dimethylacetamide/lithium chloride. Part 2: degradation of cellulose"; Elsevier; Polymer 44 (2003), pp. 7-17.
Ramos et al.; "Carboxymethylation of cellulose in the new solvent dimethyl sulfoxide/tetrabutylammonium fluoride"; Elsevier; Carbohydrate Polymers 60 (2005), pp. 259-267.
Remsing et al.; "Mechanism of cellulose dissolution in the ionic liquid 1-n-butyl-3-methylimidazolium chloride: a $^{13}$C and $^{35/37}$Cl NMR relaxation study on model systems"; The Royal Society of Chemistry 2006; Chem. Commun., 2006, pp. 1271-1273.
Rosenau et al.; "Hydrolytic Processes and Condensation Reactions in the Cellulose Solvent System N,N-Dimethylacetamide/Lithium Chloride. Part 1."; Holzforschung 55 (2001), pp. 661-666.
Saalwächter et al.; "Cellulose Solutions in Water Containing Metal Complexes"; Macromolecules 2000, 33, pp. 4094-4107.
Schlufter et al.; "Efficient Homogeneous Chemical Modification of Bacterial Cellulose in the Ionic Liquid 1-N-Butyl-3-methylimidazolium Chloride"; Macromolecular Rapid Communications, 2006, 27, pp. 1670-1676.
Swatloski et al.; "Dissolution of Cellulose with Ionic Liquids"; J. Am. Chem. Soc., 2002, 124, pp. 4974-4975.
Varma et al.; "An expeditious solvent-free route to ionic liquids using microwaves"; The Royal Society of Chemistry 2001; Chem. Commun., 2001, pp. 643-644.
Wagenknecht, W., et al.; "Regioselective homogeneous sulfaction of cellulose via unstable intermediates"; Cellulosics: Materials for Selective Separations and Other Technologies, 1993, Chapter 24, 205-211.
Wagenknecht, Wolfgang; "Regioselectively substituted cellulose derivatives by modification of commercial cellulose acetates"; Papier (Darmstadt) (1996), 50(12), 712-720.
Wenz, G., et al.; "Synthesis, control of substitution pattern and phase transitions of 2,3-di-O-methylcellulose"; Carbohydrate Research, 2000, 326, 67-79.
Wu et al.; "Homogeneous Acetylation of Cellulose in a New Ionic Liquid"; Biomacromolecules 2004, 5, pp. 266-268.
Xie, Jiangbing, et al.; "Enzyme-catalyzed transesterification of vinyl ester on cellulose and its regioselectivity"; Abstracts of Paper, 221$^{st}$ ACS National Meeting, San Diego, CA, United States, Apr. 1-5, 2001 (2001), Cell-068.
Xie, Jiangbing, et al.; "Modification of cellulose solids by enzyme-catalyzed transesterification with vinyl esters in anhydrous organic solvents"; ACS Symposium Series (2003), 840(Biocatalysis in Polymer Science), 217-230.
Xie, Jiangbing, et al.; "Regioselectivity of enzyme catalyzed transesterification of cellulose"; Polymer Preprints (American Chemical Society, Division of Polymer Chemistry) (2001), 42(1), 512-513.
Yoshida et al.; "Preparation of polymer brush-type cellulose β-ketoesters using LiCl/1,3-dimethyl-2-imidazolidinone as a solvent"; Elsevier; Polymer 46 (2005), pp. 2548-2557.
Zhang et al.; "1-Allyl-3-methylimidazolium Chloride Room Temperature Ionic Liquid: A New and Powerful Nonderivatizing Solvent for Cellulose"; Macromolecules 2005, 38, pp. 8272-8277.
Zhu et al.; "Dissolution of cellulose with ionic liquids and its application: a mini-review"; Green Chem., 2006, 8, pp. 325-327.
Notification of Transmittal of the International Search Report and the Written Opinion of the International Searching Authority, or the Declaration dated Nov. 7, 2008; International Application No. PCT/US2008/009624.
Notification of Transmittal of the International Search Report and the Written Opinion of the International Searching Authority, or the Declaration dated Nov. 5, 2008; International Application No. PCT/US2008/009625.
Notification of Transmittal of the International Search Report and the Written Opinion of the International Searching Authority, or the Declaration dated Nov. 18, 2008; International Application No. PCT/US2008/009622.
Co-pending U.S. Appl. No. 12/539,814, titled "Cellulose Solutions Comprising Tetraalkylammonium Alkylphosphate and Products Produced Therefrom", filed Aug. 12, 2009, Buchanan et al.

(56) References Cited

OTHER PUBLICATIONS

Co-pending U.S. Appl. No. 12/539,800, titled "Regioselectively Substituted Cellulose Esters Produced in a Carboxylated Ionic Liquid Process and Products Produced Therefrom", filed Aug. 12, 2009, Buchanan et al.
Co-pending U.S. Appl. No. 12/539,812, titled "Regioselectively Substituted Cellulose Esters Produced in a Halogenated Ionic Liquid Process and Products Produced Therefrom", filed Aug. 12, 2009, Buchanan et al.
Co-pending U.S. Appl. No. 12/539,817, titled "Regioselectively Substituted Cellulose Esters Produced in a Tetraalkylammonium Alkylphosphate Ionic Liquid Process and Products Produced Therefrom", filed Aug. 12, 2009, Buchanan et al.
Notification of Transmittal of the International Search Report and the Written Opinion of the International Searching Authority, or the Declaration dated Nov. 20, 2009; International Application No. PCT/US2009/004637.
Cao, et al.; "Room temperature ionic liquid (RTILs): A new and versatile platform for cellulose processing and derivation"; Chemical Engineering Journal 147 (2009) 13-21.
Notification of Transmittal of the International Search Report and the Written Opinion of the International Searching Authority, or the Declaration dated Nov. 13, 2009; International Application No. PCT/US2009/004638.
Ren, et al.; "Acetylation of wheat straw hemicelluloses in ionic liquid using iodine as a catalyst"; Carbohydrate Polymers 70(2007) 406-414.
Granstrom, et al.; "Tosylation and acylation of cellulose in 1-allyl-3-methylimidazolium chloride"; Springer Science + Business Media B.V. 2008; Cellulose (2008) 15:481-488.
Kohler, et al.; "Efficient synthesis of cellulose furoates in 1-N-butyl-3-methylimidazolium chloride"; Springer Science + Business Media B.V. 2007; Cellulose (2007) 14:489-495.
Meng, et al.; "Graft copolymers prepared by atom transfer radical polymerization (ATRP) from cellulose"; Polymer 50 (2009) 447-454.
Notification of Transmittal of the International Search Report and the Written Opinion of the International Searching Authority, or the Declaration dated Dec. 28, 2009; International Application No. PCT/US2009/004624.
Notification of Transmittal of the International Search Report and the Written Opinion of the International Searching Authority, or the Declaration dated Dec. 28, 2009; International Application No. PCT/US2009/004626.
Kern et al., "Synthesis, Control of Substitution Pattern and Phase Transitions of 2,3-di-O-methylcellulose," Carbohydrate Research, 2000, 326, pp. 67-79.
USPTO Office Action dated Mar. 2, 2011 for copending U.S. Appl. No. 12/030,387.
Murugesan, S. et al., "Dialkyl Imidazolium Benzoates—Room Temperature Ionic Liquids Useful in the Peracetylation and Perbenzoylation of Simple and Sulfated Saccharides," Synlett, 2003, pp. 1283-1286, No. 9, Georg Thieme Verlag Stuttgart, New York.
Kohler, S. et al., "Interactions of Ionic Liquids with Polysaccharides 1. Unexpected Acetylation of Cellulose with 1-Ethyl-3-methylimidazolium Acetate," Macromolecular Rapid Communications, published online Oct. 22, 2007, pp. 2311-2317, 28, Wiley InterScience.
Ruben S. et al., "Tracer Studies with Radioactive Carbon. The Exchange between Acetic Anhydride and Sodium Acetate," J. Am. Chem. Soc., 1942, p. 3050, vol. 64.
Avicel for Solid Dose Forms, FMC Biopolymer website, http://wwvv.bmcbiopolymer.com/; Feb. 24, 2011.
Abbott, A. et al., "O-Acetylation of cellulose and monosaccharides using a based ionic liquid," Green Chemistry, 2005, pp. 705-707, vol. 7.
USPTO Office Action dated Jun. 22, 2011 for copending U.S. Appl. No. 12/189,421.
USPTO Office Action dated Jun. 9, 2011 for copending U.S. Appl. No. 12/189,415.
USPTO Office Action dated May 27, 2011 for copending U.S. Appl. No. 12/189,753.
USPTO Office Action dated Jun. 21, 2011 for copending U.S. Appl. No. 12/030,434.
New copending U.S. Appl. No. 13/217,326, filed Aug. 25, 2011, Charles Buchanan et al.
USPTO Office Action dated Sep. 14, 2011 for copending U.S. Appl. No. 12/539,817.
USPTO Office Action dated Dec. 12, 2010 for copending U.S. Appl. No. 12/539,814.
USPTO Office Action dated May 7, 2010 for copending U.S. Appl. No. 12/030,425.
USPTO Notice of Allowance dated Dec. 10, 2010 for copending U.S. Appl. No. 12/030,425.
USPTO Notice of Allowance dated Nov. 21, 2011 for copending U.S. Appl. No. 12/189,421.
USPTO Office Action dated Jan. 5, 2012 for copending U.S. Appl. No. 13/217,326.
USPTO Notice of Allowance dated Nov. 16, 2011 for copending U.S. Appl. No. 12/030,387.
Tsunashima et al., "Substituent Distribution in Cellulose Acetates: Its Control and the Effect on Structure Formation in Solution," Journal of Colloid and Interface Science (2000) vol. 228, pp. 279-286.
New copending U.S. Appl. No. 13/278,796, filed Oct. 21, 2011, Charles Michael Buchanan et al.
New copending U.S. Appl. No. 13/330,828, filed Dec. 20, 2011, Charles Michael Buchanan et al.
New copending U.S. Appl. No. 13/339,814, filed Dec. 29, 2011, Charles Michael Buchanan et al.
New copending U.S. Appl. No. 13/357,636, filed Jan. 25, 2012, Charles Michael Buchanan et al.
New copending U.S. Appl. No. 13/357,635, filed Jan. 25, 2012, Charles Michael Buchanan et al.
USPTO Notice of Allowance dated Jan. 27, 2012 for copending U.S. Appl. No. 12/189,753.
USPTO Notice of Allowance dated Feb. 8, 2012 for copending U.S. Appl. No. 12/030,387.
USPTO Notice of Allowance dated Jan. 30, 2012 for copending U.S. Appl. No. 12/189,415.
USPTO Notice of Allowance dated Feb. 15, 2012 for copending U.S. Appl. No. 12/030,434.
New copending U.S. Appl. No. 13/396,700, filed Feb. 15, 2012, Charles Michael Buchanan.
Wasserscheid, P., et al., "Synthesis and Purification of Ionic Liquids," Ionic Liquids in Synthesis, (2002), pp. 7-40, Wiley-VCH Verlag GmbH & Co.
USPTO Office Action dated Feb. 29, 2012 for copending U.S. Appl. No. 12/539,800.
Takaragi, A. et al., "Reaction Characteristics of Cellulose in the LiCl/1,3-dimethyl-2-imidazolidininone Solvent System," Cellulose, 1999, vol. 6, pp. 93-102, Kluwar Academic Publishers.
New copending U.S. Appl. No. 13/409,724, filed Mar. 1, 2012, Charles Michael Buchanan et al.
New copending U.S. Appl. No. 13/409,743, filed Mar. 1, 2012, Charles Michael Buchanan et al.
New copending U.S. Appl. No. 13/409,747, filed Mar. 1, 2012, Charles Michael Buchanan et al.
Buchanan, C., "Two-Dimensional NMR of Polysaccharides: Spectral Assignments of Cellulose Triesters," Macromolecules, 1987, pp. 2750-2754, vol. 20, American Chemical Society.
USPTO Office Action dated Mar. 9, 2012 for copending U.S. Appl. No. 12/539,812.
Luo et al., J. Appl. Polym. Sci., 2006 100(4), p3288-3296, Article first published online Feb. 27, 2006.
Edgar, K.J., Cellulose Esters, Organic. Encyclopedia of Polymer Science and Technology, 2004, vol. 9, p. 129-159.
Zhu et al., Dissolution of Cellulose with Ionic Liquids and its Applications: A Mini-Review, Green Chemistry, 2006, 8, p. 325-327.

(56) References Cited

OTHER PUBLICATIONS

Office Action notification date Aug. 19, 2014 received in co-pending U.S. Appl. No. 13/409,743.
Office Action notification dated Aug. 25, 2014 received in co-pending U.S. Appl. No. 13/449,978.
Office Action notification dated Sep. 11, 2014 received in co-pending U.S. Appl. No. 13/409,747.
Office Action notification dated Nov. 13, 2014 received in co-pending U.S. Appl. No. 13/396,700.
Office Action notification dated Sep. 23, 2014 received in co-pending U.S. Appl. No. 13/486,043.
Office Action notification date Sep. 23, 2014 received in co-pending U.S. Appl. No. 13/486,042.
Office Action notification date Dec. 10, 2014 received in co-pending U.S. Appl. No. 13/706,684.
Office Action notification dated Feb. 4, 2015 received in co-pending U.S. Appl. No. 13/449,978.
Notice of Allowance and Fees Due dated Mar. 27, 2015 received in co-pending U.S. Appl. No. 12/539,800.
Office Action notification date Mar. 27, 2015 received in co-pending U.S. Appl. No. 13/409,747.
Notice of Allowance and Fees Due dated May 8, 2015 received in co-pending U.S. Appl. No. 13/409,743.
Notice of Allowance and Fees Due dated May 22, 2015 received in co-pending U.S. Appl. No. 13/706,684.
Office Action notification dated Jul. 6, 2015 received in co-pending U.S. Appl. No. 14/447,704.
Office Action notification dated Sep. 11, 2015 received in co-pending U.S. Appl. No. 13/409,747.
New copending U.S. Appl. No. 14/858,450, filed Sep. 18, 2015, Charles Buchanan et al.
Office Action notification dated Feb. 2, 2016 received in co-pending U.S. Appl. No. 13/409,747.
USPTO Notice of Allowance dated Feb. 11, 2016, for copending U.S. Appl. No. 14/447,704.
Office Action notification dated Sep. 23, 2014 received in co-pending U.S. Appl. No. 13/486,042.
Notice of Allowance and Fees Due dated Jun. 19, 2015 received in co-pending U.S. Appl. No. 13/409,743.
Notice of Allowance and Fees Due dated Jun. 22, 2015 received in co-pending U.S. Appl. No. 13/706,684.
Office Action notification dated Apr. 21, 2016 received in co-pending U.S. Appl. No. 12/539,800.
Office Action notification dated Jul. 7, 2016 received in co-pending U.S. Appl. No. 14/447,704.
Office Action notification dated Sep. 30, 2016 received in co-pending U.S. Appl. No. 13/409,747.
USPTO Notice of Allowance dated Nov. 15, 2016 for copending U.S. Appl. No. 12/539,800.
Office Action notification dated Jan. 10, 2017 received in co-pending U.S. Appl. No. 14/858,450.
Office Action notification dated Feb. 3, 2017 received in co-pending U.S. Appl. No. 14/447,704.
Co-pending U.S. Appl. No. 15/425,085, titled "Regioselectively Substituted Cellulose Esters Produced in a Carboxylated Ionic Liquid Process and Products Produced Therefrom", filed Feb. 6, 2017.
Office Action notification dated Apr. 18, 2017 received in co-pending U.S. Appl. No. 12/539,800.
USPTO Notice of Allowance dated May 24, 2017 for copending U.S. Appl. No. 13/409,747.
Office Action notification dated Jun. 28, 2017 received in co-pending U.S. Appl. No. 14/447,704.
European Search Report—Application No. 17169625.5-1302 dated Aug. 7, 2017.
USPTO Notice of Allowance dated Aug. 15, 2017 for copending U.S. Appl. No. 14/858,450.
USPTO Notice of Allowance dated Aug. 31, 2017 for copending U.S. Appl. No. 13/409,747.
USPTO Notice of Allowance dated Jan. 26, 2018 for copending U.S. Appl. No. 14/447,704.
USPTO Notice of Allowance dated Oct. 3, 2017 for copending U.S. Appl. No. 12/539,800.

\* cited by examiner

CELLULOSE ESTER OPTICAL FILMS

CROSS REFERENCE TO RELATED APPLICATIONS

This application claims priority to U.S. Provisional Application Ser. No. 61/474,932 filed Apr. 13, 2011, the disclosure of which is herein incorporated by reference in its entirety to the extent it does not contradict the statements herein.

BACKGROUND

1. Field of the Invention

Various embodiments of the present invention relate generally to cellulose ester compositions, methods of making cellulose ester compositions, and optical films produced therefrom. Certain embodiments of the present invention relate to cellulose esters having both alkyl-acyl substituents and aryl-acyl substituents, and optical films prepared therefrom.

2. Description of the Related Art

Cellulose esters such as cellulose triacetate ("CTA" or "TAC"), cellulose acetate propionate ("CAP"), and cellulose acetate butyrate ("CAB"), are used in a wide variety of films for the liquid crystal display ("LCD") industry. Most notable is their use as protective and compensation films used in conjunction with polarizer sheets. These films can typically be made by solvent casting, and then be laminated to either side of an oriented, iodinated polyvinyl alcohol ("PVOH") polarizing film to protect the PVOH layer from scratching and moisture ingress, while also increasing structural rigidity. When used as compensation films (a.k.a., waveplates), they can be laminated with the polarizer stack or otherwise included between the polarizer and liquid crystal layers. The waveplates can act to improve the contrast ratio, wide viewing angle, and color shift performance of the LCD. While significant advances have been made in LCD technology, improvements are still needed.

SUMMARY

One embodiment of the present invention concerns a regioselectively substituted cellulose ester comprising a plurality of alkyl-acyl substituents and a plurality of aryl-acyl substituents, where the regioselectively substituted cellulose ester has a hydroxyl degree of substitution ("$DS_{OH}$") of at least 0.30, where the regioselectivity of the regioselectively substituted cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is greater than 0.20.

Another embodiment of the present invention concerns a single layer optical film comprising a regioselectively substituted cellulose ester, where the regioselectively substituted cellulose ester comprises a plurality of alkyl-acyl substituents and a plurality of aryl-acyl substituents, where the regioselectively substituted cellulose ester has a hydroxyl degree of substitution ("$DS_{OH}$") of at least 0.30, where the regioselectivity of the cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is greater than 0.20.

Still another embodiment of the present invention concerns a regioselectively substituted cellulose ester comprising a plurality of alkyl-acyl substituents and a plurality of aryl-acyl substituents, where the regioselectively substituted cellulose ester has a hydroxyl degree of substitution ("$DS_{OH}$") in the range of from about 0.25 to about 0.45, where the regioselectively substituted cellulose ester has an alkyl-acyl degree of substitution ("$DS_{alkyl}$") in the range of from about 1.85 to about 2.35, where the regioselectively substituted cellulose ester has an aryl-acyl degree of substitution ("$DS_{aryl}$") in the range of from about 0.35 to about 0.65, where the regioselectivity of the regioselectively substituted cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") greater than 0.20.

Yet another embodiment of the present invention concerns a −A optical film comprising a regioselectively substituted cellulose ester, where the regioselectively substituted cellulose ester comprises a plurality of alkyl-acyl substituents and a plurality of aryl-acyl substituents.

A further embodiment of the present invention concerns a regioselectively substituted cellulose ester comprising a plurality of alkyl-acyl substituents and a plurality of aryl-acyl substituents, where the regioselectively substituted cellulose ester has a hydroxyl degree of substitution ("$DS_{OH}$") in the range of from about 0.10 to about 0.30, where the regioselectively substituted cellulose ester has an alkyl-acyl degree of substitution ("$DS_{alkyl}$") in the range of from about 0.10 to about 2.15, where the regioselectively substituted cellulose ester has an aryl-acyl degree of substitution ("$DS_{aryl}$") in the range of from about 0.75 to about 2.80, where the regioselectivity of the regioselectively substituted cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is at least 0.25.

A still further embodiment of the present invention concerns a +C optical film comprising a regioselectively substituted cellulose ester, where the regioselectively substituted cellulose ester comprises a plurality of alkyl-acyl substituents and a plurality of aryl-acyl substituents, where the regioselectively substituted cellulose ester has an aryl-acyl degree of substitution ("$DS_{aryl}$") in the range of from about 0.75 to about 2.80.

BRIEF DESCRIPTION OF THE FIGURES

Embodiments of the present invention are described herein with reference to the following drawing figures, wherein.

DETAILED DESCRIPTION

Figure 1A:
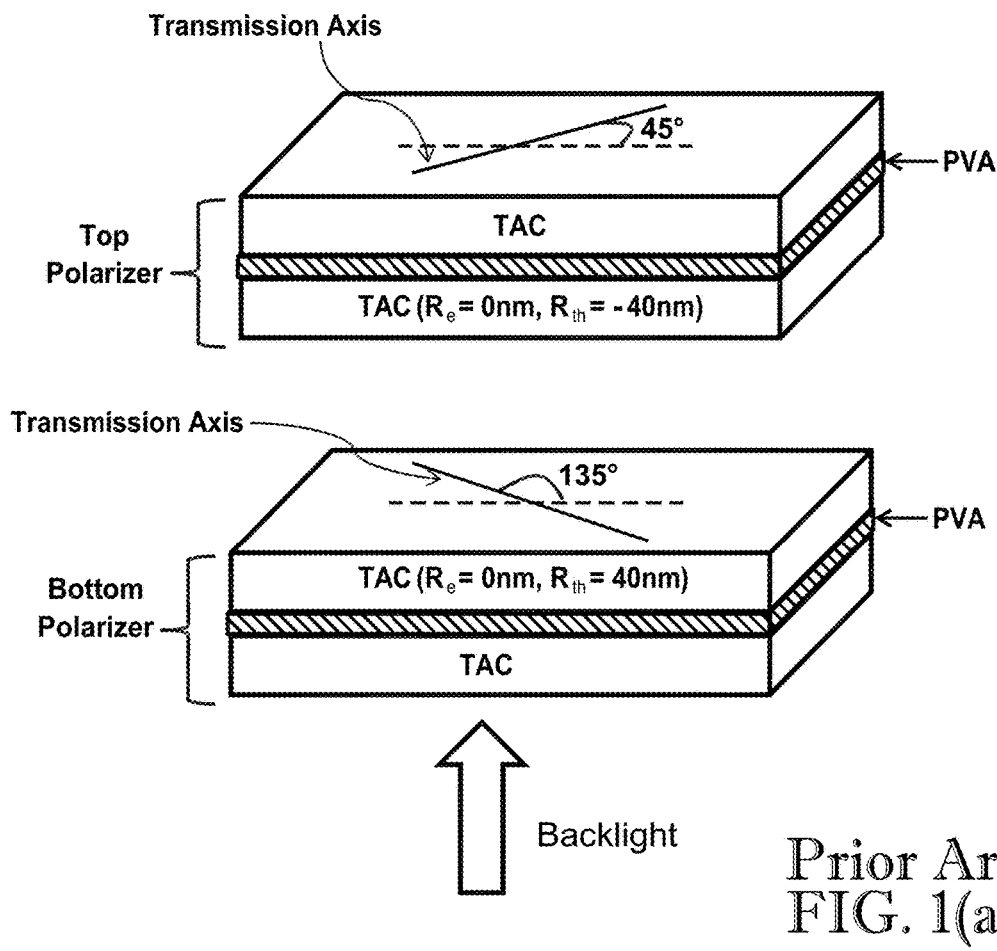
FIG. 1(a) schematically depicts backlight passing through a pair of crossed polarizers with two conventional cellulose triacetate ("TAC") films, each having an $R_e$ of 0 nm and an $R_{th}$ of −40 nm.

The present invention may be understood more readily by reference to the following detailed description of the invention and the examples provided therein. It is to be understood that this invention is not limited to the specific methods, formulations, and conditions described, as such may vary. It is also to be understood that the terminology used herein is for the purpose of describing particular aspects of the invention only and is not intended to be limiting.

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

Throughout this application, where patents or publications are referenced, the disclosures of these references in their entireties are intended to be incorporated by reference into this application, to the extent they are not inconsistent with the present invention, in order to more fully describe the state of the art to which the invention pertains.

As mentioned above, films prepared from cellulose esters can be employed in liquid crystal displays ("LCD"). Generally, LCDs employ a polarizer stacking including a set of crossed polarizers. For a typical set of crossed polarizers used in an LCD, there can be significant light leakage along the diagonals (leading to poor contrast ratio), particularly as the viewing angle is increased. Various optical films can be used to correct or "compensate" for this light leakage. These films can have certain well defined birefringences (or retardations) that vary depending on the type of liquid crystal cell used, since the liquid crystal cell itself will also impart a certain degree of undesirable optical retardation that must be corrected. Some of these compensation films are easier to make than others, so compromises are often made between performance and cost. Also, while most compensation and protective films are made by solvent casting, there is a push to make more films by melt extrusion so as to eliminate the need to handle environmentally unfriendly solvents. Having a material with more controllable optical retardation, that can be made by both solvent and melt casting, allows for greater flexibility in creating these films.

Optical films are commonly quantified in terms of birefringence which is, in turn, related to the refractive index n. The refractive index can typically be in the range of 1.4 to 1.8 for polymers in general, and can be approximately 1.46 to 1.50 for cellulose esters. The higher the refractive index, the slower a light wave propagates through that given material.

For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance, denoted $n_x$, $n_y$, and $n_z$, which correspond to the machine direction ("MD"), the transverse direction ("TD") and the thickness direction respectively. As the material becomes more anisotropic (e.g., by stretching), the difference between any two refractive indices will increase. This difference is referred to as the "birefringence." Because there are many combinations of material directions to choose from, there are correspondingly different values of birefringence. The two that are the most common, namely the planar birefringence (or "in-plane" birefringence) $\Delta_e$, and the thickness birefringence (or "out-of-plane" birefringence) $\Delta_{th}$, are defined as:

$$\Delta_e = n_x - n_y \tag{1a}$$

$$\Delta_{th} = n_z - (n_x + n_y)/2 \tag{1b}$$

The birefringence $\Delta_e$ is a measure of the relative in-plane orientation between the MD and TD directions and is dimensionless. In contrast $\Delta_{th}$ gives a measure of the orientation of the thickness direction, relative to the average planar orientation.

Another term often used with regards to optical films is the optical retardation R. R is simply the birefringence times the thickness d, of the film in question. Thus, $$R_e = \Delta_e d = (n_x - n_y) d \tag{2a}$$

$$R_{th} = \Delta_{th} d = [n_z - (n_x + n_y)/2] d \tag{2b}$$

Retardation is a direct measure of the relative phase shift between the two orthogonal optical waves and is typically reported in units of nanometers (nm). Note that the definition of $R_{th}$ varies among some authors, particularly with regards to the sign (+/−), depending on how $R_{th}$ is calculated.

Materials are also known to vary with regards to their birefringence/retardation behavior. For example, most materials when stretched will exhibit a higher refractive index along the stretch direction and a lower refractive index perpendicular to the stretch. This follows because, on a molecular level, the refractive index is typically higher along the polymer chain's axis and lower perpendicular to the chain. These materials are commonly termed "positively birefringent" and represent most standard polymers, including current commercial cellulose esters. Note that, as we will describe later, a positively birefringent material can be used to make either positive or negative birefringent films or waveplates.

To avoid confusion, the birefringence behavior of the polymer molecule itself will be referred to as the "intrinsic birefringence" and is a property of the polymer. From a material optics standpoint, intrinsic birefringence is a measure of the birefringence that would occur if the material was fully stretched with all chains perfectly aligned in one direction (for most polymers this is a theoretical limit since they can never be fully aligned). For purposes of the present invention, it also provides a measure of the sensitivity of a given polymer to a given amount of chain orientation. For example, a sample with high intrinsic birefringence is going to exhibit more birefringence during film formation than a sample with low intrinsic birefringence, even though the relative stress levels in the film are approximately the same.

Polymers can have positive, negative, or zero intrinsic birefringence. Negative intrinsic birefringent polymers exhibit a higher refractive index perpendicular to the stretch direction (relative to the parallel direction). Certain styrenics and acrylics can have negative intrinsic birefringent behavior due to their rather bulky side groups. Depending on composition, some cellulose esters having aromatic ring structures can exhibit negative intrinsic birefringence as well. Zero intrinsic birefringence, in contrast, is a special case and represents materials that show no birefringence with stretching and thus have a zero intrinsic birefringence. Such materials can be ideal for certain optical applications as they can be molded, stretched, or otherwise stressed during processing without showing any optical retardation or distortion.

The actual compensation film(s) that is used in an LCD can take on a variety of forms including biaxial films where all three refractive indices differ and two optical axes exist, and uniaxial films having only one optical axis where two of the three refractive indices are the same. There are also other classes of compensation films where the optical axes twist or tilt through the thickness of the film (e.g., discotic films), but these are generally of lesser importance. Generally, the type of compensation film that can be made is limited by the birefringence characteristics of the polymer (i.e., positive, negative or zero intrinsic birefringence). A few examples are described below.

In the case of uniaxial films, a film having refractive indices such that $$n_x > n_y = n_z \text{ "+}A\text{" optical film} \tag{3a}$$

is denoted as a "+A" optical film. In such films, the x-direction (machine direction) of the film has a high refractive index, whereas the y and thickness directions are approximately equal in magnitude (and lower than $n_x$). This type of film is also referred to as a positive uniaxial crystal structure with the optic axis along the x-direction. Such films can be made by uniaxially stretching a positive intrinsic birefringent material using, for example, a film stretcher.

In contrast, a "−A" uniaxial film is defined as $$n_x < n_y = n_z \text{ "−}A\text{" optical film} \tag{3b}$$

where the x-axis refractive index is lower than the other directions (which are approximately equal). One method for making a −A optical film is to stretch a negative intrinsic birefringent polymer or, alternately, by coating a negatively (intrinsic) birefringent liquid crystal polymer onto a surface such that the molecules are lined up in a preferred direction (for example, by using an underlying etched orientation layer).

In terms of retardation, "±A" optical films have the following relationship between $R_e$ and $R_{th}$, shown in (3c):

$$R_{th} = -R_e/2 \text{ "±}A\text{" optical films} \tag{3c}$$

Another class of uniaxial optical films is the C optical film which can also be "+C" or "−C". The difference between a C and an A optical film is that, in C optical films, the unique refractive index (or optical axis) is in the thickness direction as opposed to in the plane of the film. Thus, $$n_z > n_y = n_x \text{ "+}C\text{" optical film} \tag{4a}$$

$$n_z < n_y = n_x \text{ "−}C\text{" optical film} \tag{4b}$$

C optical films can be produced by taking advantage of the stresses that form during solvent casting of a film. Tensile stresses are generally created in the plane of the film due to the restraint imposed by the casting belt, which are also equi-biaxial stretched in nature. These tend to align the chains in the plane of the film resulting in −C or +C films for positive and negative intrinsic birefringent materials respectively. As many cellulose ester films used in displays are solvent cast, and many are essentially positive birefringent, then it is apparent that solvent cast cellulose esters normally only produce −C optical films. These films can also be uniaxially stretched to produce +A optical films (assuming the initial as-cast retardation is very low).

Besides uniaxial optical films, it is also possible to use biaxial oriented films. Biaxial films are quantified in a variety of ways including simply listing the 3 refractive indices $n_x$, $n_y$, and $n_z$ in the principal directions (along with the direction of these principal axes). Generally, $n_x \neq n_y \neq n_z$.

One specific biaxial oriented film has unique optical properties to compensate light leakage of a pair of crossed polarizer or in-plane switching ("IPS") mode liquid crystal displays. The optical film has a parameter Nz in the range of from about 0.4 to about 0.9, or equals about 0.5, where Nz is defined as $$Nz = (n_x - n_z)/(n_x - n_y) \tag{5}$$

This parameter gives the effective out-of-plane birefringence relative to the in-plane birefringence. Nz can be chosen to be about 0.5 when used as a compensation film for a pair of crossed polarizers. When Nz is about 0.5, the corresponding out-of-plane retardation, $R_{th}$, equals about 0.0 nm.

To show the optical film's compensation effect, the following light transmission or leakage of a pair of crossed polarizers with and without compensation films is calculated by computer simulation.

Figure 1B:
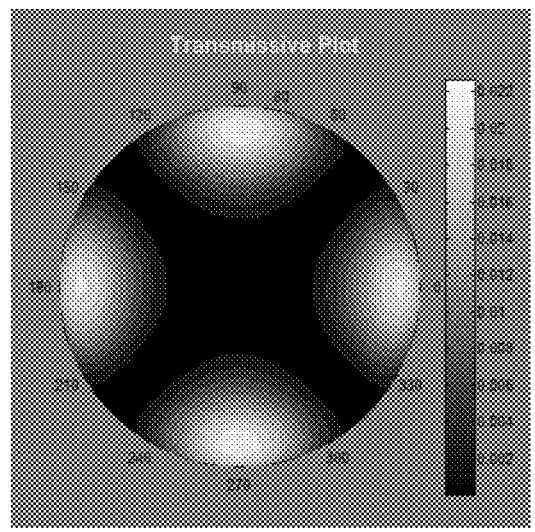
FIG. 1(b) depicts the calculated iso-contour plot of light transmission or light leakage of the structure depicted in FIG. 1(a)

FIG. 1(a) schematically indicates backlight passing through a pair of crossed polarizers having two conventional cellulose triacetate ("TAC") films, both of which have $R_e = 0$ nm and $R_{th} = -40$ nm. FIG. 1(b) shows the calculated iso-contour plot of light transmission or light leakage according to the configuration structure of FIG. 1(a), which has a polar angle from 0° to 80° and an azimuthal angle from 0° to 360°. The calculated results show that there exists about 2.2% light leakage at 45° along the polarizer transmission axes.

Figure 2A:
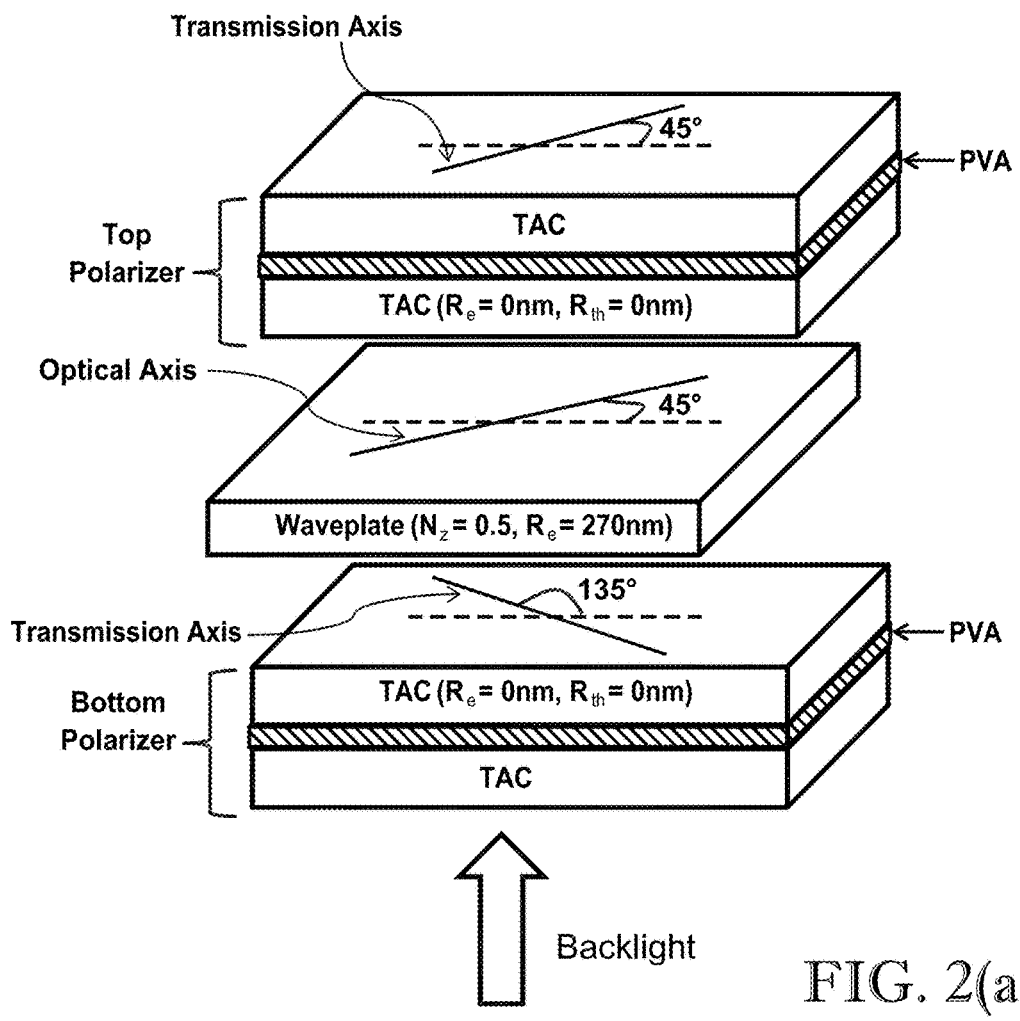
FIG. 2(a) schematically depicts backlight passing through a pair of crossed polarizers with a waveplate having an Nz of 0.5 and an $R_e$ of 270 nm disposed therebetween, where each polarizer comprises a zero retardation TAO film adjacent to the waveplate.
Figure 2B:
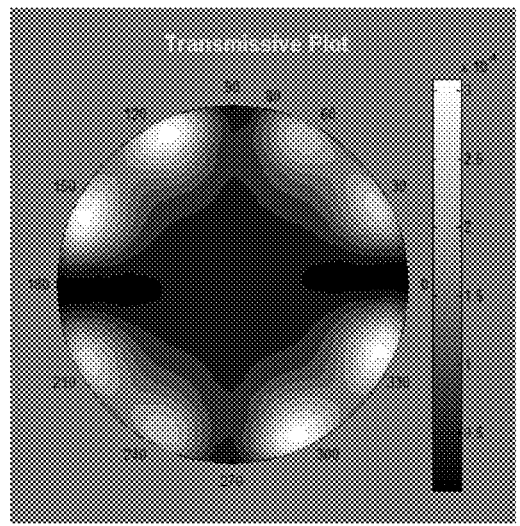
FIG. 2(b) depicts the calculated iso-contour plot of light transmission or light leakage of the structure depicted in FIG. 2(a)

FIG. 2(a) schematically indicates backlight passing through a pair of crossed polarizers with one waveplate of Nz=0.5, $R_e = 270$ nm, and two zero retardation TAO films ($R_e = 0$ nm and $R_{th} = 0$ nm). FIG. 2(b) shows the calculated iso-contour plot of light transmission or light leakage according to the configuration structure of FIG. 2(a), which has a polar angle from 0° to 80° and an azimuthal angle from 0° to 360°. The calculated results show that the maximum light leakage is reduced to about 0.03% at 45° along the polarizer transmission axes, which is a great improvement compared to the case illustrated in FIG. 1. Thus, a waveplate with Nz=0.5 and $R_e = 270$ nm can play a role in reducing light leakage. Of course, such results are not limited to only waveplates having an Nz of 0.5 with an $R_e$ of 270. For example, the waveplate could also be a −A optical film with an $R_e$ of −270 nm, among others. If this waveplate is a cellulose based ester, it could replace one of the zero retardation films and adhere directly to the PVA layer, which could in turn reduce the manufacturing cost. As described below, various embodiments presented herein concern optical films (e.g., waveplates) having an Nz in the range of from about 0.4 to about 0.9, or of about 0.5, comprising cellulose esters.

Figure 3A:
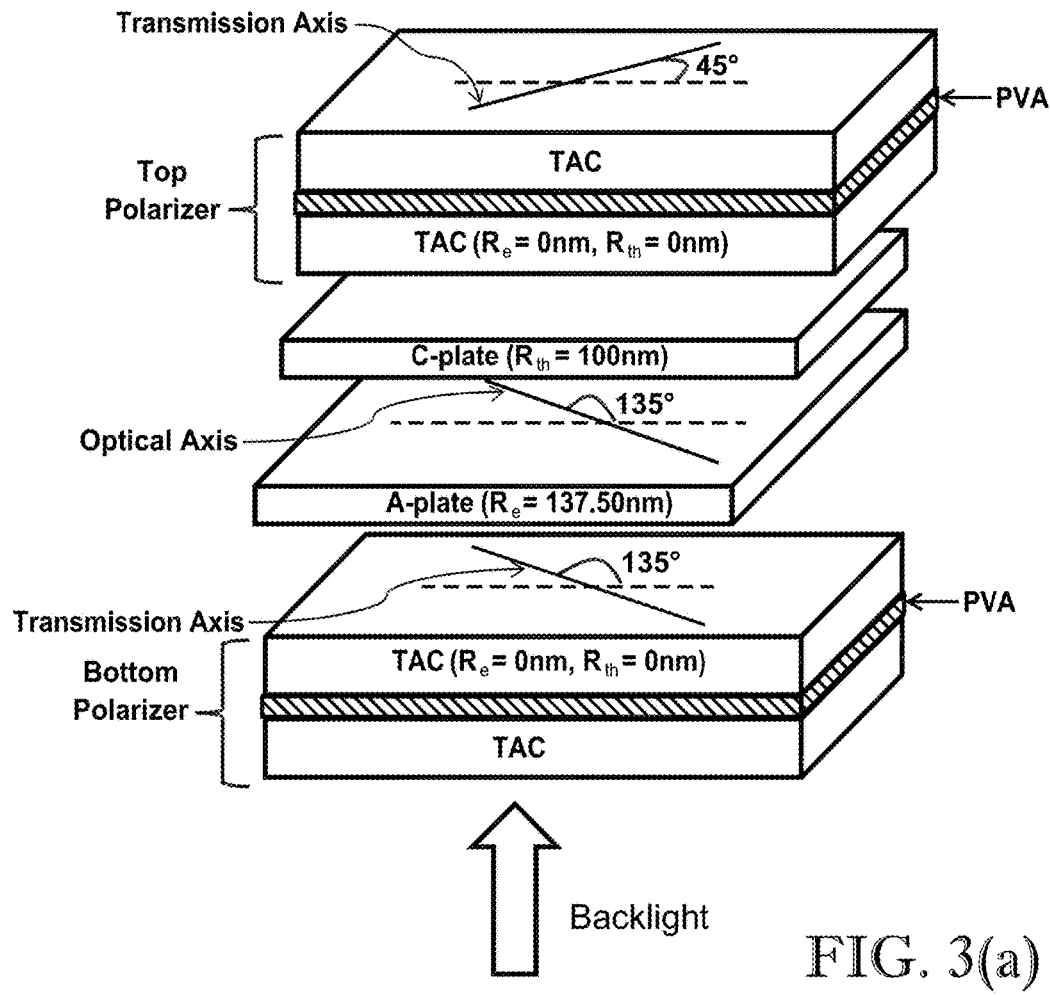
FIG. 3(a) schematically depicts backlight passing through a bottom polarizer and a top polarizer, where the pair of polarizers are crossed and have one +A plate ($R_e$=137.5 nm) and one +C plate ($R_{th}$=100 nm) disposed therebetween, where each polarizer comprises a zero retardation TAO film adjacent to the +A plate and +C plate, respectively.
Figure 3B:
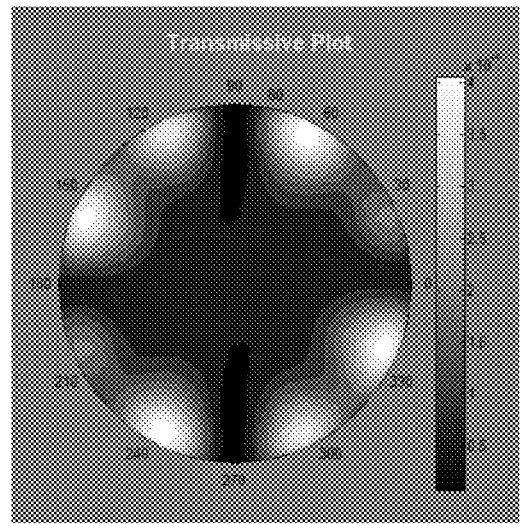
FIG. 3(b) depicts the calculated iso-contour plot of light transmission or light leakage of the structure depicted in FIG. 3(a)

FIG. 3(a) schematically indicates backlight passing through a pair of crossed polarizers with one +A optical film ($R_e = 137.5$ nm), one +C optical film ($R_{th} = 100$ nm) and two zero retardation TAO films (Re=0 nm and $R_{th} = 0$ nm). FIG. 3(b) shows the calculated iso-contour plot of light transmission or light leakage according to the configuration structure of FIG. 3(a), which has a polar angle from 0° to 80° and an azimuthal angle from 0° to 360°. The calculated results show that the maximum light leakage is reduced to about 0.04% at 45° along the polarizer transmission axes, which is also a great improvement compared to the case illustrated in FIG. 1. Therefore, the positive A and C optical films with indicated retardations played a role in reducing the light leakage. It needs to be pointed out that the waveplate could also be a −A optical film (with, for example, an $R_e$ of −137.5 nm) combined with a −C optical film (with, for example, an $R_{th}$ of −100 nm). The −A optical film could replace the bottom zero retardation film and adhere directly to the PVA layer, which in turn could reduce manufacturing costs. Various embodiments presented herein relate to −A optical films comprising cellulose esters.

The above simulation examples demonstrate that by adding appropriate optical films (e.g., waveplates), the light leakage of a pair of crossed polarizers can be greatly reduced. These optical films also could be used to compensate light leakage of in-plane switching ("IPS") mode liquid crystal displays, since, though not wishing to bound by theory, it is believed that the light leakage of IPS-LCDs comes primarily from the crossed polarizers.

In accordance with various embodiments of the present invention, there are provided regioselectively substituted cellulose esters having a plurality of alkyl-acyl substituents and a plurality of aryl-acyl substituents. Such cellulose esters can be used in forming optical films, which can in turn be employed alone or in combination with other optical films as waveplates (i.e., compensation films) used in liquid crystal displays ("LCD").

Regioselectively substituted cellulose esters suitable for use in making optical films can comprise a plurality of alkyl-acyl substituents and a plurality of aryl-acyl substituents. As used herein, the term "acyl substituent" shall denote a substituent having the structure:

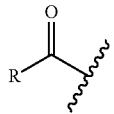

Such acyl groups in cellulose esters are generally bound to the pyranose ring of the cellulose via an ester linkage (i.e., through an oxygen atom).

As used herein, the term "aryl-acyl" substituent shall denote an acyl substituent where "R" is an aryl group. As used herein, the term "aryl" shall denote a univalent group formed by removing a hydrogen atom from a ring carbon in an arene (i.e., a mono- or polycyclic aromatic hydrocarbon), and may include heteroatoms. Examples of aryl groups suitable for use in various embodiments include, but are not limited to, phenyl, benzyl, tolyl, xylyl, and naphthyl. Such aryl groups can be substituted or unsubstituted. In various embodiments, at least a portion of the aryl-acyl substituent can be benzoate. In further embodiments, all or substantially all of the aryl-acyl substituent can be benzoate.

As used herein, the term "alkyl-acyl" shall denote an acyl substituent where "R" is an alkyl group. As used herein, the term "alkyl" shall denote a univalent group formed by removing a hydrogen atom from a non-aromatic hydrocarbon, and may include heteroatoms. Alkyl groups suitable for use herein can be straight, branched, or cyclic, and can be saturated or unsaturated. Alkyl groups suitable for use herein include any $C_1$ to $C_{20}$, $C_1$ to $C_{12}$, $C_1$ to $C_5$, or $C_1$ to $C_3$ alkyl groups. In various embodiments, the alkyl can be a $C_1$ to $C_5$ straight chain alkyl group. In still other embodiments, the alkyl can be a $C_1$ to $C_3$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. In one or more embodiments, at least a portion of the alkyl-acyl substituent can be acetate, propionate, and/or butyrate. In further embodiments, all or substantially all of the alkyl-acyl substituent can be acetate, propionate, and/or butyrate. In still other embodiments, the alkyl-acyl substituent can be selected from the group consisting of acetate, propionate, and mixtures thereof.

In various embodiments, regioselectively substituted cellulose esters can be employed in which the aryl-acyl substituent is preferentially installed at C2 and C3 of the pyranose ring. Regioselectivity can be measured by determining the relative degree of substitution ("RDS") at C6, C3, and C2 in the cellulose ester by carbon 13 NMR (Macromolecules, 1991, 24, 3050-3059). In the case of one type of acyl substituent or when a second acyl substituent is present in a minor amount (DS<0.2), the RDS can be most easily determined directly by integration of the ring carbons. When 2 or more acyl substituents are present in similar amounts, in addition to determining the ring RDS, it is sometimes necessary to fully substitute the cellulose ester with an additional substituent in order to independently determine the RDS of each substituent by integration of the carbonyl carbons. In conventional cellulose esters, regioselectivity is generally not observed and the RDS ratio of C6/C3, C6/C2, or C3/C2 is generally near 1 or less. In essence, conventional cellulose esters are random copolymers. In contrast, when adding one or more acylating reagents to cellulose dissolved in an appropriate solvent, the C6 position of cellulose is acylated much faster than C2 and C3 positions. Consequently, the C6/C3 and C6/C2 ratios are significantly greater than 1, which is characteristic of a 6,3- or 6,2-enhanced regioselectively substituted cellulose ester.

Examples of regioselectively substituted cellulose esters and their methods for preparation are described in US 2010/0029927, US 2010/0267942, and U.S. patent application Ser. No. 12/539,812; the contents of which are hereby incorporated by reference. In general, these applications concern preparation of cellulose esters by dissolution of cellulose in an ionic liquid, which is then contacted with an acylating reagent. Accordingly, for various embodiments of the present invention, two general methods can be employed for preparing regioselectively substituted cellulose esters. In one method, regioselectively substituted cellulose esters can be prepared using a staged addition by first contacting the cellulose solution with one or more alkyl acylating reagents followed by contacting the cellulose solution with an aryl acylating reagent at a contact temperature and contact time sufficient to provide a cellulose ester with the desired degree of substitution ("DS") and degree of polymerization ("DP"). In this staged addition, the acyl groups containing alkyl groups can be preferentially installed at C6 and the acyl groups containing an aryl group can be preferentially installed at C2 and/or C3. Alternatively, the regioselectively substituted cellulose esters can be prepared by contacting the cellulose solution with one or more alkyl acylating reagents followed by isolation of the alkyl ester in which the acyl groups containing alkyl groups are preferentially installed at C6. The alkyl ester can then be dissolved in any appropriate organic solvent and contacted with an aryl acylating reagent which can preferentially install the acyl groups containing an aryl group at C2 and/or C3 at a contact temperature and contact time sufficient to provide a cellulose ester with the desired degree of substitution ("DS") and degree of polymerization ("DP"). The cellulose esters thus prepared generally comprise the following structure:

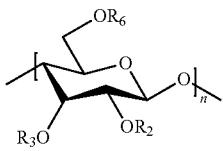

where $R_2$, $R_3$, and $R_6$ are hydrogen (with the proviso that $R_2$, $R_3$, and $R_6$ are not hydrogen simultaneously), alkyl-acyl groups, and/or aryl-acyl groups (such as those described above) bound to the cellulose via an ester linkage.

The degree of polymerization ("DP") of the cellulose esters prepared by these methods can be at least 10. In other embodiments, the DP of the cellulose esters can be at least 50, at least 100, or at least 250. In other embodiments, the DP of the cellulose esters can be in the range of from about 5 to about 100, or in the range of from about 10 to about 50.

Acylating reagents suitable for use herein can include, but are not limited to, alkyl or aryl carboxylic anhydrides, carboxylic acid halides, and/or carboxylic acid esters containing the above-described alkyl or aryl groups suitable for use in the acyl substituents of the regioselectively substituted cellulose esters described herein. Examples of suitable carboxylic anhydrides include, but are not limited to, acetic anhydride, propionic anhydride, butyric anhydride, and benzoic anhydrides. Examples of carboxylic acid halides include, but are not limited to, acetyl, propionyl, butyryl, and benzoyl chlorides. Examples of carboxylic acid esters include, but are not limited to, acetyl, propionyl, butyryl, and benzoyl methyl esters. In one or more embodiments, the acylating reagent can be one or more carboxylic anhydrides selected from the group consisting of acetic anhydride, propionic anhydride, butyric anhydride, and benzoic anhydride.

During esterification of cellulose dissolved in ionic liquids, the contact temperature can be in the range of from about 20 to about 140° C., in the range of from about 50 to about 120° C., or in the range of from about 80 to about 100° C. In the esterification of cellulose dissolved in ionic liquids, the contact time can be in the range of from about 1 minute to about 48 hours, in the range of from about 10 minutes to about 24 hours, or in the range of from about 30 minutes to about 5 hours.

The regioselectively substituted cellulose esters described herein can have various substituent degrees of substitution. In certain embodiments, the regioselectively substituted cellulose esters can have a hydroxyl degree of substitution ("$DS_{OH}$") of at least 0.30, at least 0.40, at least 0.50, or in the range of from about 0.50 to about 0.70. In these embodiments, the regioselectively substituted cellulose ester can have an alkyl-acyl degree of substitution ("$DS_{alkyl}$") in the range of from about 1.60 to about 2.00, in the range of from about 1.60 to about 1.90, or in the range of from about 1.65 to about 2.00. Additionally, in these embodiments, the regioselectively substituted cellulose ester can have an aryl-acyl degree of substitution ("$DS_{aryl}$") in the range of from about 0.50 to about 0.70, in the range of from about 0.60 to about 0.70, or in the range of from about 0.50 to about 0.68. In such embodiments, the regioselectivity of the regioselectively substituted cellulose esters can be such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is greater than 0.20, in the range of from about 0.22 to about 0.50, or in the range of from about 0.25 to about 0.45.

In certain other embodiments, the regioselectively substituted cellulose esters can have a $DS_{OH}$ in the range of from about 0.25 to about 0.45. In these embodiments, the regioselectively substituted cellulose ester can have a $DS_{alkyl}$ in the range of from about 1.85 to about 2.35, in the range of from about 1.85 to about 2.25, or in the range of from about 1.95 to about 2.35. Additionally, in these embodiments, the regioselectively substituted cellulose ester can have a $DS_{aryl}$ in the range of from about 0.35 to about 0.65, in the range of from about 0.40 to about 0.65, or in the range of from about 0.35 to about 0.60. In such embodiments, the regioselectivity of the regioselectively substituted cellulose esters can be such that the sum of $C2DS_{aryl}$ and $C3DS_{aryl}$ minus $C6DS_{aryl}$ is greater than 0.20, in the range of from about 0.21 to about 0.45, or in the range of from about 0.23 to about 0.40.

In still other embodiments, the regioselectively substituted cellulose esters can have a $DS_{OH}$ in the range of from about 0.10 to about 0.30. In these embodiments, the regioselectively substituted cellulose ester can have a $DS_{alkyl}$ in the range of from about 0.10 to about 2.15, in the range of from about 0.75 to about 2.05, or in the range of from about 1.20 to about 1.85. Additionally, in these embodiments, the regioselectively substituted cellulose ester can have a $DS_{aryl}$ in the range of from about 0.75 to about 2.80, in the range of from about 0.80 to about 2.00, or in the range of from about 1.00 to about 1.60. In such embodiments, the regioselectivity of the regioselectively substituted cellulose esters can be such that the sum of $C2DS_{aryl}$ and $C3DS_{aryl}$ minus $C6DS_{aryl}$ is at least 0.25, in the range of from about 0.30 to about 1.10, or in the range of from about 0.70 to about 1.05. Alternatively, the regioselectivity of the regioselectively substituted cellulose esters in these embodiments can be such that the sum of $C2DS_{aryl}$ and $C3DS_{aryl}$ minus $C6DS_{aryl}$ is in the range of from about 0.25 to about 0.80, or in the range of from about 0.50 to about 0.70.

As noted above, certain embodiments of the present invention relate to single layer optical films. In various embodiments, such single layer optical films can be uniaxial or biaxial optical films. Additionally, such single layer optical films can have an Nz in the range of from about 0.40 to about 0.90, in the range of from about 0.45 to about 0.78, or about 0.50. The single layer optical films can have an out-of-plane retardation (determined according to formula 2(b), above; "$R_{th}$") in the range of from about −50 to about +50 nm, in the range of from about 0 to about +50 nm, or in the range of from about 0 to about +20 nm. Additionally, the single layer optical films can have an in-plane retardation (determined according to formula 2(a), above; "$R_e$") in the range of from about −100 to about −300 nm, in the range of from about −170 to about −290 nm, or in the range of from about −200 to about −270 nm.

Such single layer optical films can comprise one or more of the above-described regioselectively substituted cellulose esters. In various embodiments, the single layer optical films can comprise a regioselectively substituted cellulose ester having a $DS_{OH}$ of at least 0.30, at least 0.40, at least 0.50, or in the range of from about 0.50 to about 0.70; a $DS_{alkyl}$ in the range of from about 1.60 to about 2.00, in the range of from about 1.60 to about 1.90, or in the range of from about 1.65 to about 2.00; and a $DS_{aryl}$ in the range of from about 0.50 to about 0.70, in the range of from about 0.60 to about 0.70, or in the range of from about 0.50 to about 0.68. Additionally, the single layer optical films can comprise a cellulose ester having a regioselectivity such that the sum of $C2DS_{aryl}$ and $C3DS_{aryl}$ minus $C6DS_{aryl}$ is greater than 0.20, in the range of from about 0.22 to about 0.50, or in the range of from about 0.25 to about 0.45. In various embodiments, such a regioselectively substituted cellulose ester can constitute at least 50 weight percent, at least 75 weight percent, at least 95 weight percent, at least 99 weight percent, substantially all or all of the single layer optical film.

As noted above, certain embodiments of the present invention relate to −A optical films. As described above, −A optical films are those films having refractive indices satisfying the equation: $n_z < n_y$, where $n_y$ is approximately equal to $n_x$. In various embodiments, such −A optical films can have an Nz in the range of from about 0.95 to about 1.50, or in the range of from about 0.97 to about 1.10. Additionally, the −A optical films can have an $R_{th}$ in the range of from about +50 to about +150 nm, in the range of from about +70 to about +125 nm, or in the range of from about +75 to about +100 nm. Furthermore, the −A optical films can have an $R_e$ in the range of from about −100 to about −300 nm, in the range of from about −120 to about −220 nm, or in the range of from about −150 to about −200 nm.

Such −A optical films can comprise one or more of the above-described regioselectively substituted cellulose esters. In various embodiments, the −A optical films can comprise a regioselectively substituted cellulose ester having a $DS_{OH}$ in the range of from about 0.25 to about 0.45; a $DS_{alkyl}$ in the range of from about 1.85 to about 2.35, in the range of from about 1.85 to about 2.25, or in the range of from about 1.95 to about 2.35; and a $DS_{aryl}$ in the range of from about 0.35 to about 0.65, in the range of from about 0.40 to about 0.65, or in the range of from about 0.35 to about 0.60. Additionally, the −A optical films can comprise a cellulose ester having a regioselectivity such that the sum of $C2DS_{aryl}$ and $C3DS_{aryl}$ minus $C6DS_{aryl}$ is greater than 0.20, in the range of from about 0.21 to about 0.45, or in the range of from about 0.23 to about 0.40. In various embodiments, such a regioselectively substituted cellulose ester can constitute at least 50 weight percent, at least 75 weight percent, at least 95 weight percent, at least 99 weight percent, substantially all or all of the −A optical film.

As noted above, certain embodiments of the present invention relate to +C optical films. As described above, +C optical films are those films having refractive indices satisfying the equation: $n_z > n_y$, where $n_y$ is approximately equal to $n_x$. In various embodiments, such +C optical films can have an $R_{th}$ in the range of from about −50 to about +800 nm, in the range of from about +50 to about +400 nm, or in the range of from about +50 to about +150 nm. Furthermore, the +C optical films can have an $R_e$ in the range of from about −15 to about +15 nm, in the range of from about −10 to about +10 nm, in the range of from about −5 to about +5 nm, or about 0 nm.

Such +C optical films can comprise one or more of the above-described regioselectively substituted cellulose esters. In various embodiments, the +C optical films can comprise a regioselectively substituted cellulose ester having a $DS_{OH}$ in the range of from about 0.10 to about 0.30; a $DS_{alkyl}$ in the range of from about 0.10 to about 2.15, in the range of from about 0.75 to about 2.05, or in the range of from about 1.20 to about 1.85; and a $DS_{aryl}$ in the range of from about 0.75 to about 2.80, in the range of from about 0.80 to about 2.00, or in the range of from about 1.00 to about 1.60. Additionally, the +C optical films can comprise a cellulose ester having a regioselectivity such that the sum of $C2DS_{aryl}$ and $C3DS_{aryl}$ minus $C6DS_{aryl}$ is at least 0.25, in the range of from about 0.30 to about 1.10, or in the range of from about 0.70 to about 1.05. Alternatively, the regioselectivity of the regioselectively substituted cellulose esters employed in the +C optical films can be such that the sum of $C2DS_{aryl}$ and $C3DS_{aryl}$ minus $C6DS_{aryl}$ is in the range of from about 0.25 to about 0.80, or in the range of from about 0.50 to about 0.70. In various embodiments, such a regioselectively substituted cellulose ester can constitute at least 50 weight percent, at least 75 weight percent, at least 95 weight percent, at least 99 weight percent, substantially all or all of the +C optical film.

Any of the above-described optical films can have an average thickness in the range of from about 40 to about 120 μm, in the range of from about 40 to about 70 μm, or in the range of from about 5 to about 20 μm. As used herein, "average thickness" shall denote an average of at least three evenly-spaced measurements of the optical film's thickness.

In various embodiments, additives such as plasticizers, stabilizers, UV absorbers, antiblocks, slip agents, lubricants, dyes, pigments, retardation modifiers, etc. may be mixed with the regioselectively substituted cellulose esters used in preparing the above-described optical films. Examples of these additives can be found, for example, in U.S. Patent Application Publication Nos. US 2009/0050842, US 2009/0054638, and US 2009/0096962, the contents of which are incorporated herein by reference.

Any of the above-described optical films can be made by solvent casting, melt extrusion, lamination, or a coating process. These procedures are generally known in the art. Examples of solvent casting, melt extrusion, lamination, and coating methods can be found, for example, in U.S. Patent Application Publication Nos. US 2009/0050842, US 2009/0054638, and US 2009/0096962, the contents of which are incorporated herein by reference. Further examples of solvent casting, melt extrusion, lamination, and coating methods to form films can be found, for example, in U.S. Pat. Nos. 4,592,885 and 7,172,713, and U.S. Patent Application Publication Nos. US 2005/0133953 and US 2010/0055356, the contents of which are incorporated herein by reference.

In order to assist in obtaining the desired Re and Rth values using the regioselectively substituted cellulose esters described herein, the films can be stretched. By adjusting the stretch conditions, such as stretch temperature, stretch type (uniaxial or biaxial), stretch ratio, pre-heat time and temperature, and post-stretch annealing time and temperature, the desired Re, and Rth, can be achieved. The precise stretching conditions may depend upon the specific composition of the regioselectively substituted cellulose ester, the amount and type of plasticizer, and the glass transition temperature of that specific composition. Hence, the specific stretching conditions can vary widely. In various embodiments, the stretching temperature can be in the range of from about 160 to about 200° C. Additionally, the stretch ratio based on 1.0 in the transverse direction ("TD") can range from about 1.3 to about 2.0 in the machine direction ("MD"). The pre-heat time can be in the range of from about 10 to about 300 seconds, and the pre-heat temperature can be the same as the stretch temperature. The post-annealing time can range from about 0 to about 300 seconds, and the post-annealing temperature can range from about 10 to about 40° C. below the stretching temperature. Film thickness may depend upon the film thickness before stretching and upon the stretching conditions. After stretching, the film thickness can be from about 1 μm to about 500 μm, from about 5 μm to about 200 μm, or from about 10 μm to about 120 μm.

In addition to the optical properties, the films prepared from the regioselectively substituted cellulose esters described herein have other valuable features. Many conventional cellulose esters used in LCD displays have relatively high moisture uptake which affects dimensional stability and results in changing optical values of the film. Films prepared from the regioselectively substituted cellulose esters described herein have low moisture uptake, and the optical values of the film change very little at high humidity and temperature. Thus, in various embodiments, the regioselectively substituted cellulose esters can contain less than 2 weight percent moisture, less than 1 weight percent moisture, or less than 0.5 weight percent moisture. In other various embodiments, the change in $R_e$ for the cellulose ester film can be less than 4 percent, less than 1 percent, or less than 0.5 percent when stored at 60° C., 100 percent relative humidity for 240 hours.

The regioselectively substituted cellulose esters described herein are surprisingly thermally stable which makes them very useful in melt extrusion of film. Thus, one aspect of the present invention relates to regioselectively substituted cellulose esters that have less than 10 percent weight loss by thermogravimetric analysis at 330° C., 340° C., or 350° C.

As noted above, the optical films described herein can be employed in LCDs. Particularly, the above-described optical films can be employed as part or all of a compensation film in the polarizer stack of an LCD. As described above, polarizer stacks generally include two crossed polarizers disposed on either side of a liquid crystal layer. Compensation films can be disposed between the liquid crystal layer and one of the polarizers. In one or more embodiments, the above-described single layer optical film can be employed by itself as a compensation film (i.e., a waveplate) in an LCD. In such an embodiment, the single layer optical film can be disposed between the liquid crystal layer and one of the polarizing filters of the LCD. In other embodiments, the above-described −A optical film can be employed in a compensation film (i.e., a waveplate) in an LCD. In such embodiments, the −A optical film can be disposed adjacent to at least one additional optical film, where such additional optical film can be a −C optical film. In still other embodiments, the above-described +C optical film can be employed in a compensation film (i.e., a waveplate) in an LCD. In such embodiments, the +C optical film can be disposed adjacent to at least one additional optical film, where such additional optical film can be a +A optical film. In any of the foregoing embodiments, LCDs prepared comprising the optical films described herein can operate in in-plane-switching ("IPS") mode.

The optical films described herein can also be employed in circular polarizers. Particularly, a single quarter waveplate can be prepared comprising one or more of the above-described optical films of the present invention, which can be used to convert linear polarized light to circular polarized light. This aspect may be particularly valuable for use in circular-polarized 3-dimensional ("3-D") glasses and/or 3-D media displays, such as televisions ("3-D TV"). Accordingly, in one or more embodiments, a single quarter waveplate can be prepared comprising the above-described single layer optical film. In other various embodiments, a single quarter waveplate can be prepared comprising the above-described −A optical film. Such quarter waveplates can be applied to the glass of a 3-D TV, such as above the polarizing stack. Additionally, such quarter waveplates can be applied to the glass of 3-D glasses. In the case of 3-D glasses, the optical film can be applied so that the optical axis in one lens is perpendicular or substantially perpendicular to the optical axis of the other lens. The result in 3-D glasses is that certain observed polarization is blocked in one lens but will pass through the other lens leading to the observed 3-D optical effect. In various embodiments, a quarter waveplate comprising one or more of the above-described optical films can be employed in conjunction with at least one additional polarizer, which can be a linear polarizer.

This invention can be further illustrated by the following examples of embodiments thereof, although it will be understood that these examples are included merely for the purposes of illustration and are not intended to limit the scope of the invention unless otherwise specifically indicated.

EXAMPLES

Materials and Methods
General Procedures:

NMR Characterization: Proton NMR data were obtained on a JEOL Model Eclipse-600 NMR spectrometer operating at 600 MHz. The sample tube size was 5 mm, and the sample concentrations were ca. 20 mg/mL DMSO-$d_6$. Each spectrum was recorded at 80° C. using 64 scans and a 15 second pulse delay. One to two drops of trifluoroacetic acid-d were added to each sample to shift residual water from the spectral region of interest. Chemical shifts are reported in parts per million ("ppm") from tetramethylsilane with the center peak of DMSO-$d_6$ as an internal reference (2.49 ppm).

Quantitative carbon 13 NMR data were obtained on a JEOL Model GX-400 NMR spectrometer operating at 100 MHz. The sample tube size was 10 mm, and the sample concentrations were ca. 100 mg/mL DMSO-$d_6$. Chromium (III) acetylacetonate was added to each sample at 5 mg/100 mg cellulose ester as a relaxation agent. Each spectrum was typically recorded at 80° C. using 10000 scans and a 1 second pulse delay. Chemical shifts are reported in ppm from tetramethylsilane with the center peak of DMSO-$d_6$ as an internal reference (39.5 ppm).

Proton and carbon NMR spectral assignments of cellulose acetates and cellulose propionates of the present invention are based upon the work described in *Macromolecules*, 1987, 20, 2750 and *Macromolecules*, 1991, 24, 3050. Assignment of the benzoate carbonyl carbon resonances are based upon the work described in *Chirality*, 2000, 12, 670.

The degree of substitution for acetate ("$DS_{Ac}$"), propionate ("$DS_{Pr}$") and benzoate ("$DS_{Bz}$") of the cellulose acyl benzoates were determined by $^1$H NMR. As an example, the $DS_{pr}$ for a CBzP can be calculated by first dividing the integral of the spectral region between 0.3-1.2 ppm by 3 (methyl resonances of the propionate substituent) which is then divided by the product of the integral of the spectral region between 2.7-5.8 ppm divided by 7 (anhydroglucose ring proton resonances). Similarly, the $DS_{Bz}$ for the CBzP can be calculated by first dividing the integral of the spectral region between 7.0-8.2 ppm by 5 (benzene ring proton resonances of the benzoate substituent) which is then divided by the product of the integral of the spectral region between 2.7-5.8 ppm divided by 7 (anhydroglucose ring proton resonances). The $DS_{OH}$ can then be calculated by subtracting the sum of $DS_{pr}+DS_{Bz}$ from 3.

The relative degree of substitution ("RDS") of the cellulose acyl benzoates were determined by carbon 13 NMR. The resonance for the unsubstituted C6 carbon is centered at 60.0 ppm. After esterification at C6, the resonance shifts downfield and is centered at 62.5 ppm. The RDS at C6 can be calculated by dividing the integral of the 62.5 ppm resonance by the sum of the integrals for the 60.0 and 62.5 ppm resonances. Esterification of an alcohol causes an upfield shift of a carbon atom gamma to the carbonyl. Hence, for cellulose esters esterification at C2 is reflected in a shift of the unsubstituted C1 carbon resonance (centered at 102.3 ppm) upfield to 99.4 ppm. On this basis, the RDS at C2 can be calculated by integration of these carbon resonances. Similarly, esterification at C3 is reflected in an upfield shift of the unsubstituted C4 carbon resonance (centered at 79.6 ppm). The resonance for the substituted C4 carbon resonance partially overlaps with the C2, C3, and C5 carbon resonances. However, the RDS at C3 can be calculated by dividing the integral of the unsubstituted C4 carbon resonance by the product of the sum of the C1 and C6 carbon resonances divided by 2. Subtraction of the resulting value from 1 gives the RDS at C3.

The $C6DS_{Bz}$ and the $C2DS_{Bz}+C3DS_{Bz}$ were determined by integration of the benzoate carbonyl carbon resonances. Integration of the spectral region between 164.6-165.8 ppm gives the fraction corresponding to $C6_{Bz}$ and integration of the spectral region between 163.4-164.6 ppm gives the fraction corresponding to $C2_{Bz}+C3_{Bz}$. The $C6DS_{Bz}$ and the $C2DS_{Bz}+C3DS_{Bz}$ can then be calculated by multiplying the $DS_{Bz}$ obtained by $^1H$ NMR by the resulting integral fractions for $C6_{Bz}$ and $C2_{Bz}+C3_{Bz}$.

Solution preparation: Cellulose ester solids and 10 wt % plasticizer were added to $CH_2Cl_2$ or 90/10 $CH_2Cl_2$/acetone to give a final concentration of 12 wt % based on cellulose ester+plasticizer. The mixture was sealed, placed on a roller, and mixed for 24 hours to create a uniform solution.

The solution prepared above was cast onto a glass plate using a doctor blade to obtain a film with the desired thickness. Casting was conducted in a fume hood with relative humidity controlled at 45%~50%. After casting, the film was allowed to dry for 45 minutes under a cover pan to minimize rate of solvent evaporation before the pan was removed. The film was allowed to dry for 15 minutes then the film was peeled from the glass and annealed in a forced air oven for 10 minutes at 100° C. After annealing at 100° C., the film was annealed at a higher temperature (120° C.) for another 10 minutes.

Film stretching was done by a Brückner Karo IV laboratory film stretcher. Stretching conditions, such as stretch ratio, stretch temperature, pre-heating and post-annealing, can affect the film's final optical retardations and dispersion. Stretching conditions are provided below for each of the samples that follow.

Film optical retardation and dispersion measurements were made using a J. A. Woollam M-2000V Spectroscopic Ellipsometer having a spectral range from 370 to 1000 nm. RetMeas (Retardation Measurement) program from J. A. Woollam Co., Inc. was used to obtain optical film in-plane ($R_e$) and out-of-plane ($R_{th}$) retardations.

Example 1. $N_z$ Optical Films: Preparation of a Cellulose Benzoate Propionate ($DS_{Pr}$=1.91, $DS_{Bz}$=0.62) by a Staged Addition and Measurement of Optical Properties. (EX1020-114)

To a 300 mL 3-neck round bottom flask was added 81.85 g of tributylmethylammonium dimethylphosphate ("TBMADMP"). The TBMADMP was heated to 100° C. where it was held for 3 h at 0.68-1.20 mm Hg. N-Methylpyrrolidone (NMP, 35.04 g, 30 wt %) was added to the TBMADMP and the solution was cooled to room temperature. To this solution was added 8.79 g (7 wt %) of DPv 657 cellulose (4 min addition). The heterogeneous mixture was stirred for 1 h 40 min at room temperature. An IR probe for in situ monitoring of reactions (Mettler-Toledo AutoChem, Inc., Columbia, Md., USA) was inserted before the mixture was heated to 100° C. The mixture was stirred overnight (15 h 10 min) at 100° C. which provided a clear homogeneous cellulose solution.

Figure 4:
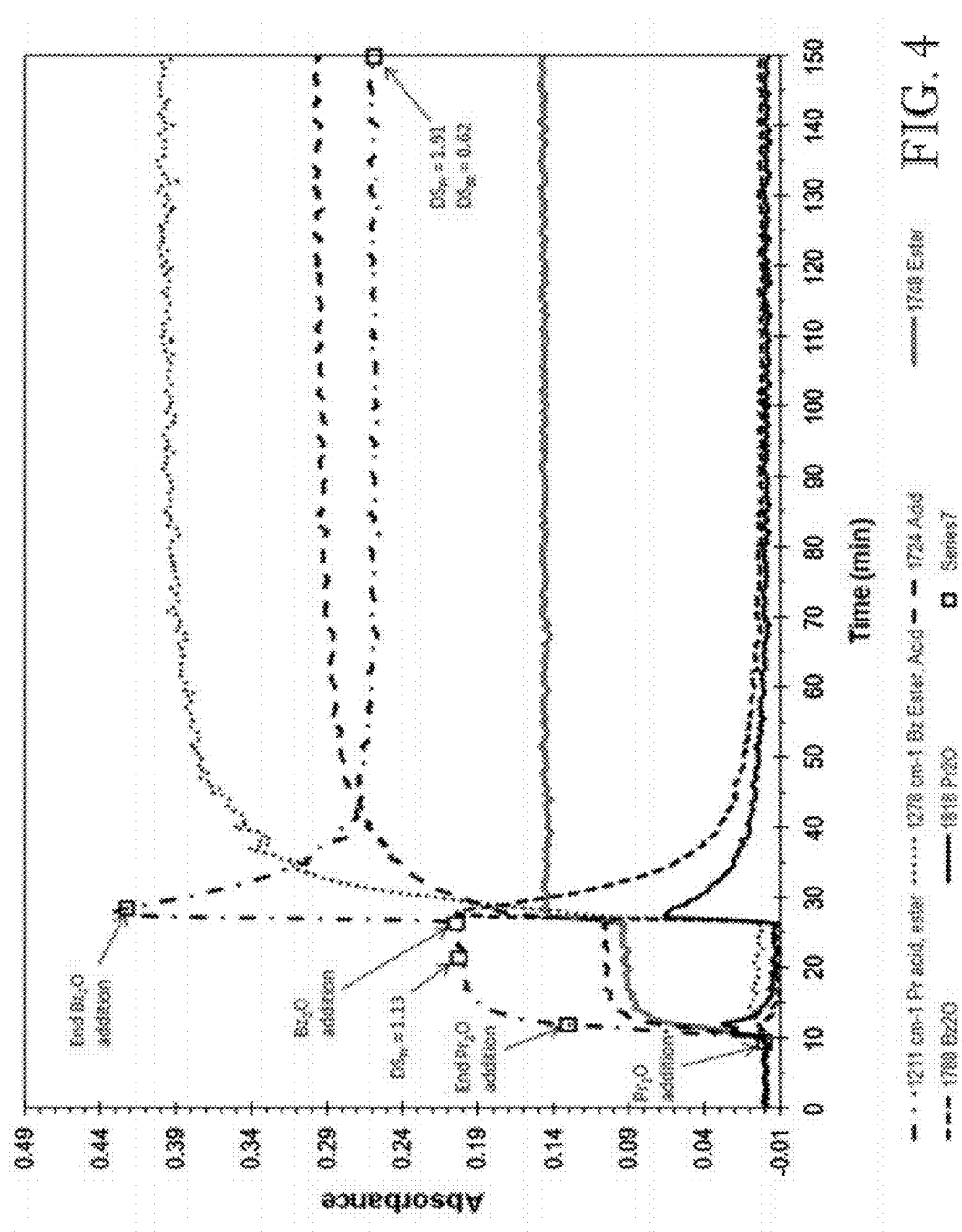
FIG. 4 is a plot of absorbance versus contact time during esterification of cellulose dissolved in tributylmethylammonium dimethylphosphate ("[TBMA]DMP")
Figure 5:
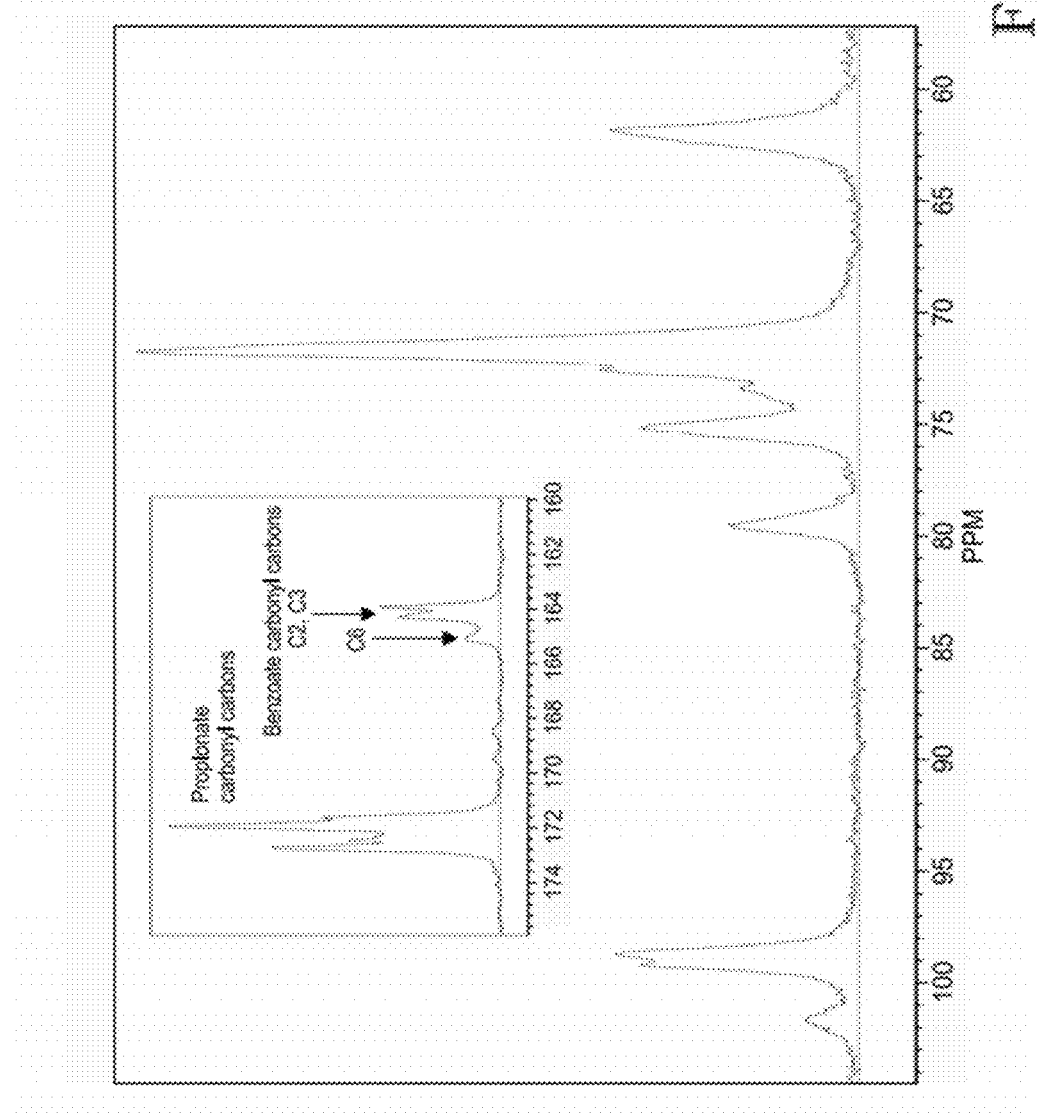
FIG. 5 shows a carbon 13 NMR spectrum of a cellulose benzoate propionate.

To the cellulose solution was added 9.88 g (1.4 eq) propionic anhydride (3 min addition). Twelve minutes after starting the propionic anhydride addition, IR showed that all of the propionic anhydride had been consumed (FIG. 4). A sample was removed and the cellulose propionate was isolated by precipitation with MeOH. Following filtration, the sample was washed 4 times with MeOH before the white solid was dried (5 mm Hg, 50° C.). Analysis by $^1H$ NMR revealed that this sample had a $DS_{pr}$=1.13 and that the propionate was primarily located at C6. Following the sample removal, 34.3 g (2.8 eq) of $Bz_2O$ was added to the remaining solution as a solid (2 min addition). In addition to a band at 1788 $cm^{-1}$ corresponding to $Bz_2O$, a band at 1818 $cm^{-1}$ corresponding to $Pr_2O$ was immediately observed by IR (FIG. 4). This is thought to be due to reaction of $Bz_2O$ with residual propionic acid from the first reaction stage resulting in formation of a mixed anhydride and/or $Pr_2O$. The absorbance due to these two bands slowly decreases over time with a corresponding increase in the band at 1724 $cm^{-1}$ (carboxylic acid). After 2 h 5 min from the start of the $Bz_2O$ addition, IR indicated that all of the anhydrides had been consumed. The cellulose benzoate propionate was isolated by precipitation with MeOH. Following filtration, the sample was washed 10 times with MeOH before the white solid was dried (5 mm Hg, 50° C.). Analysis by $^1H$ NMR revealed that this sample had a $DS_{pr}$=1.91 and a $DS_{Bz}$=0.62. Analysis by $^{13}C$ NMR showed that the relative degree of substitution was: C6=1.00, C3=0.63, C2=0.83. By integration of the benzoate carbonyl resonances, $^{13}C$ NMR also showed that $C2DS_{Bz}+C3DS_{Bz}-C6DS_{Bz}$=0.35 (FIG. 5).

Using the cellulose benzoate propionate ($DS_{Pr}$=1.91, $DS_{Bz}$=0.62), film was cast ($CH_2Cl_2$) according to the general film casting procedure. The film was then stretched according to the general film stretching procedure. The results are summarized in Table 1.

TABLE 1

$R_e$ and $R_{th}$ for non-stretched and stretched film prepared from a cellulose benzoate propionate ($DS_{Pr}$ = 1.91, $DS_{Bz}$ = 0.62).

| | Stretched film | | | | Stretching Condition | |
|---|---|---|---|---|---|---|
| Sample | Re (nm) | Rth (nm) | Nz | d (μm) | Temp (° C.) | TD × MD |
| 1 | −107.75 | −4.82 | 0.46 | 74 | 165 | 1 × 1.3 |
| 2 | −150.86 | 1.08 | 0.51 | 70 | 165 | 1 × 1.4 |
| 3 | −221.73 | 41.40 | 0.69 | 70 | 170 | 1 × 1.6 |

[1]All of the samples were stretched using a preheat time of 25 seconds and a speed of 14%/s.

As illustrated in this example, staged addition in which 1.4 eq Pr2O is added first results in a cellulose propionate with a DS=1.13 in which the propionate is primarily installed at C6 with lesser amounts at C2 and C3. Upon addition of Bz2O, a mixture of anhydrides are formed which react competitively with the cellulose. The resulting cellulose benzoate propionate has a higher DSPr (DSPr=1.91) than is expected based upon the number of equivalents of Pr2O added due to the formation of the mixed anhydrides. The result is a cellulose benzoate propionate with a DSBz=0.62 in which the benzoate is primarily located on C2 and C3. When film is cast using this CBzP dissolved in CH2Cl2 and stretched at 1×1.6 (TD×MD), the resulting film (sample 3) has an Re of −221 nm and an Rth of 41 nm at a film thickness of 70 μm, which is ideal for preparing Nz optical films. At lower stretch ratios (1×1.3 or 1×1.4), the absolute value of Re is smaller but suitable for Nz optical films.

Example 2. $N_z$ Optical Films: Preparation of a Cellulose Benzoate Propionate ($DS_{Pr}$=2.03, $DS_{Bz}$=0.51) by a Staged Addition and Measurement of Optical Properties. (EX1020-127)

A cellulose benzoate propionate ($DS_{Pr}$=2.03, $DS_{Bz}$=0.51) was prepared according to the general procedure illustrated in Example 1. The relative degree of substitution ("RDS") for this cellulose benzoate propionate was determined by $^{13}C$ NMR. This sample had a total RDS of C6=1.00; C3=0.64, and C2=0.84. For benzoate substitution, this sample had a regioselectivity such that the sum of benzoate degrees of substitution at C2 and C3 ($C2DS_{Bz}+C3DS_{Bz}$) minus the benzoate degree of substation at C6 ($C6DS_{Bz}$) was 0.33.

A film was cast ($CH_2Cl_2$) and stretched using this cellulose benzoate propionate according to the general film casting and stretching procedures. The results are summarized in Table 2.

TABLE 2

$R_e$ and $R_{th}$ for non-stretched and stretched film prepared from a cellulose benzoate propionate ($DS_{Pr}$ = 2.03, $DS_{Bz}$ = 0.51).

| | Stretched Film | | | | Stretching Conditions | |
|---|---|---|---|---|---|---|
| Sample | Re (nm) | Rth (nm) | Nz | d (μm) | Temp (° C.) | TD × MD |
| 4 | −112.42 | 4.98 | 0.54 | 76 | 170 | 1 × 1.40 |
| 5 | −124.70 | 41.06 | 0.83 | 76 | 178 | 1 × 1.50 |
| 6 | −162.02 | 43.86 | 0.77 | 80 | 172 | 1 × 1.60 |
| 7 | −216.66 | 41.47 | 0.69 | 94 | 170 | 1 × 1.60 |
| 8 | −209.05 | 52.08 | 0.75 | 88 | 172 | 1 × 1.65 |

[1]All of the samples were stretched using a preheat time of 25 seconds and a speed of 14%/s.

This example shows that with increasing stretch ratios, the absolute values of both $R_e$ and $R_{th}$ increase. For example, at the same film thickness (76 μm) changing the stretch ratio from 1×1.40 to 1×1.50 increases $R_e$ from −112.4 to −124.7 nm and $R_{th}$ from 5.0 to 41.1 nm (sample 4 and 5). This example also shows the importance of film thickness and the temperature at which the film is stretched. Film sample 6 had an $R_e$ of −162.0 nm and an $R_{th}$ of 43.9 nm when stretched at 172° C. When the stretching temperature was decreased to 170° C. and the film thickness was increased to 94 μm (sample 7), $R_e$ increased to −216.7 nm but $R_{th}$ (41.5 nm) was essentially unchanged relative to sample 6. As this example illustrates, a cellulose benzoate propionate with a $DS_{Bz}$=0.51 in which the propionate is primarily located on C2 and C3 is suitable for Nz optical films when the film is stretched according to the preferred conditions of the present invention.

Example 3. $N_z$ Optical Films: Preparation of a Cellulose Benzoate Acetate ($DS_{Ac}$=1.81, $DS_{Bz}$=0.62) by a Staged Addition and Measurement of Optical Properties. (EX1020-122)

A cellulose benzoate acetate ($DS_{Ac}$=1.81, $DS_{Bz}$=0.62) was prepared according to the general procedure of Example 1. In this case, 1 eq of $Ac_2O$ was added first followed by 3.4 eq of $Bz_2O$. The relative degree of substitution ("RDS") for this cellulose benzoate acetate was determined by $^{13}C$ NMR. This sample had a total RDS of 06=1.00; C3=0.57, and 02=0.78. For benzoate substitution, this sample had a regioselectivity such that the sum of benzoate degrees of substitution at C2 and C3 ($C2DS_{Bz}+C3DS_{Bz}$) minus the benzoate degree of substation at C6 ($C6DS_{Bz}$) was 0.44.

A film was cast (90/10 $CH_2Cl_2$/acetone) and stretched using this cellulose benzoate acetate according to the general film casting and stretching procedures. The results are summarized in Table 3.

TABLE 3

$R_e$ and $R_{th}$ for non-stretched and stretched film prepared from a regioselectively substituted cellulose benzoate acetate ($DS_{Ac}$ = 1.81, $DS_{Bz}$ = 0.62).

| | | | | | Stretching conditions | | |
|---|---|---|---|---|---|---|---|
| | Stretched | | | | | | Preheat |
| Sample | $R_e$ (nm) | $R_{th}$ (nm) | Nz | d (μm) | TD × MD | Temp (° C.) | Speed (%/s) | Time (s) |
| 9 | −103.15 | 33.24 | 0.82 | 82 | 1 × 1.3 | 190 | 14 | 25 |
| 10 | −163.99 | 46.03 | 0.78 | 80 | 1 × 1.4 | 190 | 14 | 25 |
| 11 | −131.99 | 44.20 | 0.84 | 76 | 1 × 1.4 | 195 | 14 | 25 |
| 12 | −179.15 | 47.28 | 0.76 | 72 | 1 × 1.5 | 195 | 3 | 40 |

This example shows that a cellulose benzoate acetate with a $DS_{Bz}$=0.62 in which the benzoate is primarily located on C2 and C3 is also suitable for Nz optical films when the film is stretched according to the preferred conditions of the present invention. Relative to CBzP, a higher stretching temperature is required due to the difference in glass transition temperatures between these two types of cellulose esters. This example also shows that the absolute values of both $R_e$ and $R_{th}$ increase with increasing stretch ratios (cf. samples 9 and 10). Analogous to the CBzP, this example also shows the importance of film thickness and the temperature at which the film is stretched. When the stretching temperature was dropped from 195° C. to 190° C., $R_e$ increased from −132.0 to −164 nm (cf. samples 10 and 11) while $R_{th}$ remained relatively unchanged, despite the fact that sample 11 was a thicker film (80 μm).

Example 4. (Comparative Example, US 2009/0082557) Preparation of a Cellulose Benzoate Acetate Propionate ($DS_{Bz}$=0.62) by Esterification of Cellulose Followed by Hydrolysis then Installation of Benzoate and Measurement of Optical Properties. (EX368-13)

A non-regioselectively substituted cellulose acetate propionate was prepared by first esterifying cellulose to the triester followed by hydrolysis according to the method described by Shelton et al. (US 2009/0096962). This process typically yields a cellulose ester with a high C6 $DS_{OH}$ (e.g., $DS_{Pr}$=1.77, $DS_{Ac}$=0.16, C6 RDS=0.56, C3 RDS=0.71, C2 RDS=0.66).

To a 2 L 3-neck flask was added 1 L of anhydrous pyridine. While stirring, 65.05 g of the non-regioselectively substituted cellulose acetate propionate was added to the pyridine. The heterogeneous mixture was heated to 50° C. at which point the CAP slowly dissolved. Following dissolution, benzoyl chloride (33.3 g) was slowly added (20 min addition). The solution was stirred under $N_2$ for 20 h at 50° C. before cooling to 24° C. The contact mixture was then slowly added to 8 L of vigorously stirred ethanol. The resulting solid was isolated by filtration and washed with 8 L of additional ethanol. Following drying, 77 g of an off-white solid was obtained. Proton NMR showed that the CBzAP had a $DS_{Bz}=0.62$. Due to the fact that the starting CAP had a high C6 $DS_{OH}$, the benzoate was primarily installed at C6. In contrast, the benzoate is primarily installed at C2 and C3 in the cellulose acyl benzoates of the present invention.

Film was cast (90/10 $CH_2Cl_2$/THF) and stretched according to the general film casting and stretching procedures. The results are summarized in Table 4.

TABLE 4

$R_e$ and $R_{th}$ for stretched film prepared from non-regioselectively substituted cellulose benzoate acetate propionate.

| | Stretched film | | | | Stretching conditions | |
|---|---|---|---|---|---|---|
| Sample | Re (nm) | Rth (nm) | Nz | d (um) | TD × MD | Temp (° C.) |
| 13 | −48.75 | 27.00 | 1.05 | 81 | 1 × 1.3 | 140 |
| 14 | −84.85 | 40.40 | 0.98 | 78 | 1 × 1.4 | 140 |
| 15 | −52.41 | 51.53 | 1.48 | 80 | 1 × 1.3 | 145 |
| 16 | −79.93 | 59.44 | 1.24 | 89 | 1 × 1.4 | 145 |
| 17 | −47.26 | 61.15 | 1.79 | 88 | 1 × 1.3 | 150 |
| 18 | −71.29 | 66.00 | 1.43 | 97 | 1 × 1.4 | 150 |
| 19 | −40.33 | 68.01 | 2.19 | 93 | 1 × 1.3 | 155 |
| 20 | −46.86 | 49.65 | 1.56 | 75 | 1 × 1.4 | 155 |
| 21 | −33.81 | 56.21 | 1.76 | 95 | 1 × 1.3 | 160 |
| 22 | −61.43 | 79.85 | 1.80 | 105 | 1 × 1.4 | 160 |
| 23 | −61.64 | 70.30 | 1.64 | 92 | 1 × 1.5 | 160 |

[1]All of the samples were stretched using a preheat time of 25 seconds and a speed of 14%/s.

This example shows that a non-regioselectively substituted cellulose benzoate propionate with a $DS_{Bz}=0.62$ in which the benzoate is primarily located on C6 is not suitable for Nz optical films regardless of the stretching conditions employed. In all cases, $R_e$ is too low while $R_{th}$ is generally too large.

Example 5. (Comparative Example, US 2009/0082557) Preparation of a Cellulose Benzoate Acetate ($DS_{Bz}=0.86$) by Esterification of Cellulose Followed by Hydrolysis then Installation of Benzoate and Measurement of Optical Properties. (EX368-27)

A non-regioselectively substituted cellulose acetate was prepared by first esterifying cellulose to the triester followed by hydrolysis according to the general method described in Example 4. The resulting cellulose acetate had a $DS_{Ac}=1.78$.

A CBzA was prepared following the procedure described in Example 4. Proton NMR showed that the CBzAP had a $DS_{Bz}=0.86$. Due to the fact that the starting CA had a high C6 $DS_{OH}$, the benzoate was primarily installed at C6.

Film was cast (90/10 $CH_2Cl_2$/THF) and stretched according to the general film casting and stretching procedures. The results are summarized in Table 5.

TABLE 5

$R_e$ and $R_{th}$ for stretched film prepared from non-regioselectively substituted cellulose benzoate acetate.

| | Stretched film | | | | Stretching conditions | |
|---|---|---|---|---|---|---|
| Sample | Re (nm) | Rth (nm) | Nz | d (um) | TD × MD | Temp (° C.) |
| 24 | 44.10 | 8.10 | 0.32 | 100 | 1 × 1.3 | 165 |
| 25 | 67.70 | 24.00 | 0.15 | 112 | 1 × 1.4 | 165 |
| 26 | 73.60 | 11.70 | 0.34 | 88 | 1 × 1.5 | 165 |
| 27 | 36.40 | 17.40 | 0.02 | 90 | 1 × 1.3 | 170 |
| 28 | 53.70 | 29.00 | −0.04 | 108 | 1 × 1.4 | 170 |
| 29 | 67.50 | 21.50 | 0.18 | 82 | 1 × 1.5 | 170 |

[1]All of the samples were stretched using a preheat time of 25 seconds and a speed of 14%/s.

This example shows that a non-regioselectively substituted cellulose benzoate propionate with a $DS_{Bz}=0.86$ in which the benzoate is primarily located on C6 is not suitable for Nz optical films regardless of the stretching conditions employed. In all cases, $R_e$ is too low while $R_{th}$ is generally too large.

Example 6. –A Optical Films: Preparation of Cellulose Benzoate Propionates by a Staged Addition and Measurement of Optical Properties. (EX1020-97, 106, 111)

Cellulose benzoate propionates were prepared according to the general procedure illustrated in Example 1. The number of equivalents of $Pr_2O$ and $Bz_2O$ were adjusted to obtain the desired DS and optical values (Table 6). Samples 30 through 32 (prepared from the same cellulose benzoate propionate) had a regioselectivity such that the sum of benzoate degrees of substitution at C2 and C3 ($C2DS_{Bz}+C3DS_{Bz}$) minus the benzoate degree of substation at C6 ($C6DS_{Bz}$) was 0.38. Samples 33 and 34 (prepared from the same cellulose benzoate propionate) had a regioselectivity such that the sum of benzoate degrees of substitution at C2 and C3 ($C2DS_{Bz}+C3DS_{Bz}$) minus the benzoate degree of substation at C6 ($C6DS_{Bz}$) was 0.23. Samples 35 and 36 (prepared from the same cellulose benzoate propionate) had a regioselectivity such that the sum of benzoate degrees of substitution at C2 and C3 ($C2DS_{Bz}+C3DS_{Bz}$) minus the benzoate degree of substation at C6 ($C6DS_{Bz}$) was 0.38.

Film was cast ($CH_2Cl_2$) and stretched according to the general film casting and stretching procedures. The results are summarized in Table 6.

TABLE 6

$R_e$ and $R_{th}$ for non-stretched and stretched -A film prepared from a regioselectively substituted cellulose benzoate propionates.

| Sample | eq anhydride | $DS_{Pr}$ | $DS_{Bz}$ | $DS_{OH}$ | $R_e$ (nm) | $R_{th}$ (nm) | Nz | μm | TD × MD | Temp (° C.) |
|---|---|---|---|---|---|---|---|---|---|---|
| 30 | 1.7 eq $Pr_2O$ 1st, 3.0 eq $Bz_2O$ 2nd | 2.09 | 0.60 | 0.31 | −102.22 | 95.75 | 1.44 | 62 | 1 × 1.3 | 160 |
| 31 | 1.7 eq $Pr_2O$ 1st, 3.0 eq $Bz_2O$ 2nd | 2.09 | 0.60 | 0.31 | −121.54 | 91.63 | 1.25 | 60 | 1 × 1.4 | 160 |

TABLE 6-continued $R_e$ and $R_{th}$ for non-stretched and stretched -A film prepared from a regioselectively substituted cellulose benzoate propionates.

| Sample | eq anhydride | $DS_{Pr}$ | $DS_{Bz}$ | $DS_{OH}$ | $R_e$ (nm) | $R_{th}$ (nm) | Nz | μm | TD × MD | Temp (° C.) |
|---|---|---|---|---|---|---|---|---|---|---|
| 32 | 1.7 eq $Pr_2O$ $1^{st}$, 3.0 eq $Bz_2O$ 2nd | 2.09 | 0.60 | 0.31 | −212.48 | 121.14 | 1.07 | 66 | 1 × 1.5 | 160 |
| 33 | 2.1 eq $Pr_2O$ $1^{st}$, 2.5 eq $Bz_2O$ $2^{nd}$ | 2.32 | 0.37 | 0.31 | −122.08 | 72.41 | 1.09 | 74 | 1 × 1.5 | 160 |
| 34 | 2.1 eq $Pr_2O$ $1^{st}$, 2.5 eq $Bz_2O$ $2^{nd}$ | 2.32 | 0.37 | 0.31 | −159.35 | 74.239 | 0.97 | 68 | 1 × 1.6 | 160 |
| 35 | 1.5 eq $Pr_2O$ $1^{st}$, 3.0 eq $Bz_2O$ $2^{nd}$ | 1.93 | 0.64 | 0.43 | −139.17 | 83.08 | 1.10 | 64 | 1 × 1.4 | 165 |
| 36 | 1.5 eq $Pr_2O$ $1^{st}$, 3.0 eq $Bz_2O$ $2^{nd}$ | 1.93 | 0.64 | 0.43 | −199.92 | 95.19 | 0.98 | 62 | 1 × 1.5 | 165 |

This example shows that cellulose benzoate propionates within a select range of $DS_{Bz}$ and $DS_{OH}$ are suitable for −A optical films when the film is stretched according to the preferred conditions of the present invention. The Nz for these samples ranged from 1.44 to 0.97 which is ideal for −A optical films.

Example 7. C+ Optical Films: Preparation of Cellulose Acyl Benzoates by a Staged Addition and Measurement of Optical Properties. (EX1020-68-3, EX1020-85-2, EX1020-81-3, EX1020-90-3, EX1020-72-2, EX1020-56-3, EX1020-84-2, EX1020-69-3, EX1020-80-3, EX1020-83-3, EX1020-86-2)

Cellulose benzoate propionates were prepared according to the general procedure illustrated in Example 1. The number of equivalents of alkyl anhydride and $Bz_2O$ were adjusted to obtain the desired DS and optical values (Table 7). Additionally, the order of addition was also varied regarding the alkyl anhydride and $Bz_2O$. For samples prepared where the alkyl anhydride (e.g., acetic anhydride, propionic anhydride, or hexanoic anhydride) was added first (samples 37, 39, 40, 42, and 44-47), the cellulose acyl benzoates had a regioselectivity such that the sum of benzoate degrees of substitution at C2 and C3 ($C2DS_{Bz}$+$C3DS_{Bz}$) minus the benzoate degree of substation at C6 ($C6DS_{Bz}$) ranged from 0.30 to 1.06. For samples prepared where the benzoic anhydride was added first (samples 38, 41, and 43), the cellulose acyl benzoates had a regioselectivity such that the sum of benzoate degrees of substitution at C2 and C3 ($C2DS_{Bz}$+$C3DS_{Bz}$) minus the benzoate degree of substation at C6 ($C6DS_{Bz}$) ranged from 0.25 to 0.76.

Films were cast ($CH_2Cl_2$) according to the general film casting procedures but were not stretched. The equivalents of anhydrides, the sequence of addition, and the resulting DS values are summarized in Table 7. When an aliphatic anhydride was added prior to $Bz_2O$, additional aliphatic anhydride was added after the $Bz_2O$. This protocol was adopted to insure that the $DS_{OH}$ was very low so that the effect of $DS_{OH}$ on optical properties was removed. In most cases, this $3^{rd}$ addition was not necessary as the $DS_{OH}$ was quite low prior to the $3^{rd}$ addition. The film thickness and the optical results are summarized in Table 8. The values for $R_e$ and $R_{th}$ have been normalized to 60 μm and 20 μm in order to allow direct comparison at the same film thickness and to show the utility of these cellulose acyl benzoates as a coating on a film substrate.

TABLE 7

The equivalents of anhydrides, the sequence of addition, and the resulting DS values for cellulose acyl benzoates.

| Sample | | $DS_{Hx}$ | $DS_{Ac}$ | $DS_{Pr}$ | $DS_{Bz}$ | DS |
|---|---|---|---|---|---|---|
| 37 | 1 eq $Ac_2O$ $1^{st}$, 5 eq $Bz_2O$ $2^{nd}$, 2 eq $Ac_2O$ $3^{rd}$ | | 1.96 | | 1.09 | 3.05 |
| 38 | 3 eq $Bz_2O$ $1^{st}$, 2.0 eq $Ac_2O$ $2^{nd}$ | | 1.99 | | 1.05 | 3.04 |
| 39 | 1.5 eq $Ac_2O$ $1^{st}$, 5 eq $Bz_2O$ $2^{nd}$, 2 eq $Ac_2O$ $3^{rd}$ | | 2.29 | | 0.74 | 3.03 |
| 40 | 2 eq $Ac_2O$ $1^{st}$, 5 eq $Bz_2O$ $2^{nd}$, 2 eq $Ac_2O$ $3^{rd}$ | | 2.62 | | 0.40 | 3.02 |
| 41 | 4.5 eq $Bz_2O$ $1^{st}$, 2.0 eq $Pr_2O$ $2^{nd}$ | | | 0.89 | 1.98 | 2.87 |
| 42 | 1 eq $Pr_2O$ $1^{st}$, 5 eq $Bz_2O$ $2^{nd}$, 2 eq $Pr_2O$ $3^{rd}$ | | | 1.37 | 1.61 | 2.98 |
| 43 | 3 eq $Bz_2O$ $1^{st}$, 2.0 eq $Pr_2O$ $2^{nd}$ | | | 1.88 | 1.15 | 3.03 |
| 44 | 1.5 eq Pr2O $1^{st}$, 5 eq $Bz_2O$ $2^{nd}$, 2 eq $Pr_2O$ $3^{rd}$ | | | 1.83 | 1.13 | 2.96 |
| 45 | 2 eq $Pr_2O$ $1^{st}$, 5 eq $Bz_2O$ $2^{nd}$, 2 eq $Pr_2O$ $3^{rd}$ | | | 2.14 | 0.80 | 2.94 |
| 46 | 2.5 eq Pr2O $1^{st}$, 5 eq $Bz_2O$ $2^{nd}$, 2 eq $Pr_2O$ $3^{rd}$ | | | 2.48 | 0.53 | 3.01 |
| 47 | 1 eq $Hx_2O$ $1^{st}$, 5 eq $Bz_2O$ $2^{nd}$, 2 eq $Hx_2O$ $3^{rd}$ | 1.61 | | | 1.39 | 3.00 |

TABLE 8

Thickness, $R_e$, and $R_{th}$ for C+ films cast from different cellulose acyl benzoates. $R_e$ and $R_{th}$ have been normalized to 60 μm and 20 μm.

| Sample | d (μm) | $R_e$ | $R_{th}$ | $R_e$60 (nm) | $R_{th}$60 (nm) | $R_e$20 (nm) | $R_{th}$20 (nm) |
|---|---|---|---|---|---|---|---|
| 37 | 64 | 3.3 | 190.5 | 3.5 | 173.7 | 1.2 | 57.9 |
| 38 | 68 | 6.7 | 137.2 | 4.2 | 118.6 | 1.4 | 39.5 |
| 39 | 60 | 5.7 | 143.7 | 7.3 | 143.5 | 2.4 | 47.8 |
| 40 | 70 | 0.9 | 125.1 | 1.6 | 108.9 | 0.5 | 36.3 |
| 41 | 94 | 12.4 | 580.1 | 9.2 | 363.2 | 3.1 | 121.0 |
| 42 | 66 | 6.6 | 549.5 | 12.1 | 495.5 | 4.1 | 165.6 |
| 43 | 62 | 2.4 | 201.1 | 2.8 | 196.4 | 0.9 | 65.5 |
| 44 | 84 | 48 | 358.5 | 29.1 | 267.3 | 9.7 | 89.1 |
| 45 | 76 | 4.3 | 228.7 | 3.1 | 183.7 | 1.0 | 61.2 |

TABLE 8-continued

Thickness, $R_e$, and $R_{th}$ for C+ films cast from different cellulose acyl benzoates. $R_e$ and $R_{th}$ have been normalized to 60 μm and 20 μm.

| Sample | d (μm) | $R_e$ | $R_{th}$ | $R_e60$ (nm) | $R_{th}60$ (nm) | $R_e20$ (nm) | $R_{th}20$ (nm) |
|---|---|---|---|---|---|---|---|
| 46 | 70 | 2.0 | 138.5 | 1.4 | 117.3 | 0.5 | 39.1 |
| 47 | 92 | 7.6 | 279.5 | 3.6 | 192.3 | 1.2 | 64.1 |

This example illustrates a number of important features of the present invention related to C+ optical films. First, comparing samples 42, 44, 45, and 47 which were prepared by adding Pr₂O first and, after all of the Pr₂O was consumed, followed by Bz₂O then Pr₂O, it is observed that $R_{th}$ increases with increasing $DS_{Bz}$. That is, increasing levels of benzoate increases the absolute magnitude of $R_{th}$. Second, the order of addition of anhydrides significantly impacts the magnitude of $R_{th}$. For example, sample 41 was prepared by adding 4.5 eq Bz₂O first and, after all of the Bz₂O was consumed, followed by 2 eq Pr₂O, Sample 41 had a $DS_{Bz}$=1.98 and an $R_{th}60$ of 363.2 nm. Sample 42 was prepared by adding 1 eq Pr₂O first and, after all of the Pr₂O was consumed, followed by 5 eq Bz₂O then 2 eq Pr₂O, Sample 42 had a $DS_{Bz}$=1.61 and an $R_{th}60$ of 495.5 nm. That is, even though sample 42 had a lower $DS_{Bz}$ versus sample 41, the $R_{th}60$ for sample 42 was still significantly larger. Similar behavior can be observed when comparing samples 37 to 38 and samples 43 to 44. In every case, installation of the acyl group at C6 followed by preferential installation of benzoate at C2 and C3 leads to a larger value of $R_{th}$. Third, upon comparing sample 44 (CBzP, $DS_{Bz}$=1.13, $R_{th}60$=267.3 nm) to sample 37 (CBzA, $DS_{Bz}$=1.09, $R_{th}60$=173.7 nm) it can be seen that when the acyl group is propionate versus acetate, $R_{th}$ is larger in magnitude. Fourth, the $R_{th}20$ for many of these samples are greater than 50 nm making them suitable as a thin coating on a film substrate in the preparation of C+ optical films. That is, preferentially installing benzoate at C2 and C3 at suitable levels leads to large values of $R_{th}$ even in thin films. Finally, the $R_{th}20$ for samples 40 and 46 indicates that the $DS_{Bz}$ is too low and that these cellulose acyl benzoates are not suitable for C+ optical films.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

We claim:

1. A single layer optical film comprising a regioselectively substituted cellulose ester, wherein said regioselectively substituted cellulose ester comprises a plurality of alkyl-acyl substituents and a plurality of aryl-acyl substituents,
   wherein said regioselectively substituted cellulose ester has a hydroxyl degree of substitution ("$DS_{OH}$") of at least 0.30,
   wherein said regioselectively substituted cellulose ester has an alkyl-acyl degree of substitution ("$DS_{alkyl}$") in the range of from 1.60 to 2.03,
   wherein said regioselectively substituted cellulose ester has an aryl-acyl degree of substitution ("$DS_{aryl}$") in the range of from 0.50 to 0.70,
   wherein the regioselectivity of said cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is greater than 0.20,
   wherein said single layer optical film has an out-of-plane retardation ("$R_{th}$") in the range of from 0 to +50 nm as measured at a spectral range from 370 to 1000 nm and a normalized film thickness of 60 µm, and
   wherein said single layer optical film has an in-plane retardation ("$R_e$") in the range of from −170 to −290 nm as measured at a spectral range from 370 to 1000 nm and a normalized film thickness of 60 µm, and
   wherein said single layer optical film comprises a uniaxial stretched film; and wherein said single layer optical film has an Nz in the range of from 0.45 to 0.78.

2. The single layer optical film of claim 1, wherein said $DS_{OH}$ is at least 0.40, wherein the sum of $C2DS_{aryl}$ and $C3DS_{aryl}$ minus $C6DS_{aryl}$ is in the range of from 0.22 to 0.50.

3. The single layer optical film of claim 1, wherein said regioselectively substituted cellulose ester has a $DS_{alkyl}$ in the range of from 1.60 to 1.90, wherein said regioselectively substituted cellulose ester has a $DS_{aryl}$ in the range of from 0.60 to 0.70.

4. The single layer optical film of claim 1, wherein said regioselectively substituted cellulose ester has a $DS_{alkyl}$ in the range of from 1.65 to 2.00, wherein said regioselectively substituted cellulose ester has a $DS_{aryl}$ in the range of from 0.50 to 0.68.

5. The single layer optical film of claim 1, wherein said aryl-acyl substituent comprises a substituted or unsubstituted phenyl group, wherein said alkyl-acyl substituent comprises a $C_1$ to $C_3$ straight chain alkyl group.

6. The single layer optical film of claim 1, wherein said aryl-acyl substituent comprises benzoate, wherein said alkyl-acyl substituent comprises acetate and/or propionate.

7. The single layer optical film of claim 1, wherein said single layer optical film has an $R_{th}$ in the range of from 0 to +20 nm as measured at a spectral range from 370 to 1000 nm and a normalized film thickness of 60 µm, wherein said single layer optical film has an $R_e$ in the range of from −200 to −270 nm as measured at a spectral range from 370 to 1000 nm and a normalized film thickness of 60 µm, wherein said single layer optical film has an Nz of 0.50.

8. The single layer optical film of claim 1, wherein said $DS_{OH}$ is at least 0.40, wherein the sum of $C2DS_{aryl}$ and $C3DS_{aryl}$ minus $C6DS_{aryl}$ is in the range of from 0.25 to 0.45.

9. The single layer optical film of claim 1, wherein said single layer optical film comprises a thickness of 5 to 20 µm.

10. A liquid crystalline display ("LCD") comprising said single layer optical film of claim 1 as a single layer compensation film, wherein said single layer optical film is a waveplate, wherein said LCD operates in in-plane-switching ("IPS") mode.

11. The LCD of claim 10, wherein said LCD further comprises a plurality of polarizing filters, wherein said LCD further comprises a liquid crystal layer disposed between two of said polarizing filters, wherein said single layer optical film is disposed between one of said polarizing filters and said liquid crystal layer.

12. An article of manufacture comprising said single layer optical film of claim 1, wherein said single layer optical film is a quarter waveplate, wherein said article of manufacture is selected from the group consisting of 3-D glasses and a 3-D media display.

13. A single layer optical film comprising a regioselectively substituted cellulose ester, wherein said regioselectively substituted cellulose ester comprises an alkyl-acyl substituent and an aryl-acyl substituent,
   wherein said regioselectively substituted cellulose ester has a hydroxyl degree of substitution ("$DS_{OH}$") of 0.46 to 0.57,
   wherein said regioselectively substituted cellulose ester has an alkyl-acyl degree of substitution ("$DS_{alkyl}$") in the range of from 1.81 to 2.03,
   wherein said regioselectively substituted cellulose ester has an aryl-acyl degree of substitution ("$DS_{aryl}$") in the range of from 0.51 to 0.62,
   wherein the regioselectivity of said cellulose ester is such that the sum of the aryl-acyl degrees of substitution at C2 and C3 ("$C2DS_{aryl}$" and "$C3DS_{aryl}$") minus the aryl-acyl degree of substitution at C6 ("$C6DS_{aryl}$") is greater than 0.20,
   wherein said aryl-acyl substituent comprises benzoate,
   wherein said alkyl-acyl substituent comprises acetate and/or propionate,
   wherein said single layer optical film has an out-of-plane retardation ("$R_{th}$") in the range of from −50 to +50 nm as measured at a spectral range from 370 to 1000 nm and a normalized film thickness of 60 µm,
   wherein said single layer optical film has an in-plane retardation ("$R_e$") in the range of from −100 to −300 nm as measured at a spectral range from 370 to 1000 nm and a normalized film thickness of 60 µm,
   wherein said single layer optical film has an Nz in the range of from 0.40 to 0.90, and
   wherein said single layer optical film comprises a uniaxial stretched film.

14. The single layer optical film of claim 13, wherein said single layer optical film has an $R_{th}$ in the range of from 0 to +50 nm as measured at a spectral range from 370 to 1000 nm and a normalized film thickness of 60 µm, wherein said single layer optical film has an $R_e$ in the range of from −170 to −290 nm as measured at a spectral range from 370 to 1000 nm and a normalized film thickness of 60 µm, wherein said single layer optical film has an Nz in the range of from 0.45 to 0.78.

15. The single layer optical film of claim 13, wherein said single layer optical film has an $R_{th}$ in the range of from 0 to +20 nm as measured at a spectral range from 370 to 1000 nm and a normalized film thickness of 60 µm, wherein said single layer optical film has an $R_e$ in the range of from −200 to −270 nm as measured at a spectral range from 370 to 1000 nm and a normalized film thickness of 60 µm, wherein said single layer optical film has an Nz of 50.

16. The single layer optical film of claim 13, wherein the sum of $C2DS_{aryl}$ and $C3DS_{aryl}$ minus $C6DS_{aryl}$ is in the range of from 0.25 to 0.45.

17. The single layer optical film of claim 13, wherein said alkyl-acyl substituent comprises propionate.

18. The single layer optical film of claim 13, wherein said alkyl-acyl substituent comprises acetate.

* * * * *